(12) United States Patent
Hennessy et al.

(10) Patent No.: US 8,612,084 B2
(45) Date of Patent: Dec. 17, 2013

(54) SYSTEM AND METHOD FOR AUTONOMOUS NAVIGATION OF A TRACKED OR SKID-STEER VEHICLE

(75) Inventors: Ross Hennessy, Alexandria (AU); Florian Oppolzer, Bundoora (AU); Xiuyi Fan, Neutral Bay (AU); Surya P. N. Singh, Burwood (AU); Hugh Durrant-Whyte, Rozelle (AU)

(73) Assignee: The University of Sydney, The University of Sydney (AU)

( * ) Notice: Subject to any disclaimer, the term of this patent is extended or adjusted under 35 U.S.C. 154(b) by 0 days.

(21) Appl. No.: 13/496,481

(22) PCT Filed: Sep. 15, 2010

(86) PCT No.: PCT/AU2010/001197
§ 371 (c)(1),
(2), (4) Date: Mar. 15, 2012

(87) PCT Pub. No.: WO2011/032208
PCT Pub. Date: Mar. 24, 2011

(65) Prior Publication Data
US 2012/0179322 A1 Jul. 12, 2012

(30) Foreign Application Priority Data
Sep. 15, 2009 (AU) ................. 2009904465

(51) Int. Cl.
*G01C 22/00* (2006.01)
(52) U.S. Cl.
USPC ............... 701/25; 701/26; 701/120; 701/410; 701/436; 701/467; 340/961; 340/988; 340/990; 340/995.17; 340/995.24; 342/36; 342/357.31; 342/451; 342/455; 342/456; 318/568.1; 901/1
(58) Field of Classification Search
USPC ............ 701/3, 14, 23, 36, 24, 117, 120, 301, 701/410, 436, 467, 468, 489, 520, 532, 533, 701/538; 340/961, 988, 990, 995.17, 340/995.24, 995.23, 995.27, 357.29, 340/357.46; 342/36, 357.31, 451, 456, 455, 342/457; 318/586, 587; 708/442; 901/1; 244/75.1
See application file for complete search history.

(56) References Cited

U.S. PATENT DOCUMENTS 5,610,815 A * 3/1997 Gudat et al. ................. 701/23
7,443,154 B1 * 10/2008 Merewether et al. ........... 324/67
(Continued)

FOREIGN PATENT DOCUMENTS

WO WO 2009/109007 A1 9/2009

OTHER PUBLICATIONS

R.M. Haralick et al., "Computer and Robot Vision vol. I," Prentice Hall, cover page, pp. ix-xvi, 1, and 564-567 (2002).

(Continued)

*Primary Examiner* — McDieunel Marc
(74) *Attorney, Agent, or Firm* — Blakely, Sokoloff, Taylor & Zafman LLP

(57) ABSTRACT

An autonomous navigation system for a tracked or skid-steer vehicle is described. The system includes a path planner (54) that computes a series of waypoint locations specifying a path to follow and vehicle location sensors (82). A tramming controller (60) includes a waypoint controller (62) that computes vehicle speed and yaw rate setpoints based on vehicle location information from the vehicle location sensor and the locations of a plurality of neighboring waypoints, and a rate controller (64) that generates left and right track speed setpoints from the speed and yaw rate setpoints. A vehicle control interface actuates the vehicle controls in accordance with the left and right track speed setpoints.

33 Claims, 18 Drawing Sheets

(56) References Cited

U.S. PATENT DOCUMENTS 7,733,077 B1 * 6/2010 Merewether et al. ........... 324/67
7,734,397 B2 * 6/2010 Peterson et al. ................ 701/50
8,106,660 B1 * 1/2012 Merewether et al. ......... 324/326

OTHER PUBLICATIONS

PCT Notification of Transmittal of the International Search Report and the Written Opinion of the International SEarching Authority, of the Declaration, for PCT Counterpart Application No. PCT/AU2010/001197, 11 pages, (Oct. 28, 2010).

Thomas M. Howard, et al., "Optimal Rough Terrain Trajectory Generation for Wheeled Mobile Robots", The International Journal of Robotics Research, vol. 26, No. 2, pp. 141-166, (Feb. 2007).

Vladimir Polotski, "Enhanced Path Planning for Articulated and Skid Steering Mining Vehicles", 15th Triennial World Congress of the International Federation of Automatic Control, Barcelona, Spain, 6 pages, (Jul. 21-26, 2002).

* cited by examiner

| Node | Northing | Easting | Heading |
|---|---|---|---|
| 1 | 6 | 0 | 0 |
| 2 | -6 | 0 | 0 |
| 3 | 6 | 3.5 | 0 |
| 4 | 6 | -3.5 | 0 |
| 5 | -6 | 3.5 | 0 |
| 6 | -6 | -3.5 | 0 |
| 7 | 3.5 | 6 | $\pi/2$ |
| 8 | 3.5 | -6 | $-\pi/2$ |
| 9 | -3.5 | 6 | $-\pi/2$ |
| 10 | -3.5 | -6 | $\pi/2$ |

(a) Turning around a bend   (b) Straight line following (a) A histogram of cross-track errors that measure the path tracking performance.

(b) A histogram of drill mast positioning error.

(a) Drill mast positioning (manual operation)

(b) Drill mast positioning (automation)

SYSTEM AND METHOD FOR AUTONOMOUS NAVIGATION OF A TRACKED OR SKID-STEER VEHICLE

CROSS REFERENCE TO RELATED APPLICATIONS

This patent application is a U.S. National Phase Application under 35 U.S.C. §371 of International Application No. PCT/AU2010/001197, filed Sep. 15, 2010, entitled A SYSTEM AND METHOD FOR AUTONOMOUS NAVIGATION OF A TRACKED OR SKID-STEER VEHICLE, which claims priority to Australian Patent Application No. 2009904465, filed Sep. 15, 2009.

FIELD OF APPLICATION

This invention relates to navigation of autonomous vehicles. Application may be found particularly in the path planning and regulated movement of large autonomous vehicles in a mining environment. Other applications in robotics and vehicle automation are also possible.

BACKGROUND

Autonomous vehicles are complex systems with many hardware and software components operating in an uncertain and dynamic environment. Integrated system architecture and coherent component modules are required to build robust autonomous vehicles. Research in autonomous land vehicles, in areas such as mobility control, localization, navigation, planning, and communication have provided fruitful results that paved the road for creating intelligent autonomous vehicles.

Open-pit mining, a widely used economical mining method, usually involves operating large mining equipment in remote and potentially hazardous environments. It is therefore desirable to develop automation technology in this field to achieve higher efficiency and safety. Additional and different difficulties can be encountered in applying the aforementioned robotics technologies in the domain of open-pit mining where considerations must account for the size of the machines and their terrain interaction.

A surface drill, equipped with two actuating tracks for movement, is used to drill multi-meter-deep holes into the ground. Drilled holes are subsequently filled with explosives and blasted so that material in the ground can be removed. The positions of drill-holes are carefully planned in patterns according to the ground geology. The majority of holes in a pattern present a high level of geometric consistency, i.e., being equally spaced and aligned in certain directions. Therefore drills are mostly operated in rigorously defined manoeuvres, e.g., straight-line tramming, row shifting, three-point turning, etc.

Given a pattern of planned holes to drill, it is a particular challenge for an automated control system of a surface drilling rig to determine an appropriate path to follow, and then to follow it with sufficient accuracy to drill each of the holes.

SUMMARY OF THE INVENTION

An autonomous navigation system for a tracked or skid-steer vehicle according to a first aspect of the present invention includes:
  a path planner that computes a series of waypoint locations specifying a path to follow;
  a vehicle location sensor;
  a tramming controller including a waypoint controller that computes vehicle speed and yaw rate setpoints based on vehicle location information from the vehicle location sensor and the locations of a plurality of neighbouring waypoints, and a rate controller that generates left and right track speed setpoints from the speed and yaw rate setpoints; and
  a vehicle control interface that actuates the vehicle controls in accordance with the left and right track speed setpoints.

In computing the vehicle speed setpoint the waypoint controller may use a calculation of trajectory curvature determined at the waypoint nearest to the vehicle.

In computing the vehicle speed setpoint the waypoint controller may also use a measurement of the vehicle speed and yaw rate, and the maximum allowed vehicle speed and yaw rate.

In computing the vehicle yaw rate setpoint the waypoint controller may calculate a vehicle heading error defined by the angular difference between the vehicle heading and the vector defined by the vehicle position, the current tracking waypoint and the following waypoint.

In computing the vehicle yaw rate setpoint the waypoint controller may calculate a waypoint heading error defined by the angular difference between the vehicle heading and the desired heading at the current tracking waypoint, wherein the desired heading at a waypoint is defined as the vector that connects the waypoint and its successive waypoint.

In computing the vehicle yaw rate setpoint the waypoint controller may calculate a cross-track error defined by the distance between the vehicle position and the planned path. The cross-track error may be defined by the distance between the vehicle position and the nearest point from a fine discretization of an interpolated path through the waypoints.

The waypoint controller may compute the vehicle yaw rate setpoint on the basis of a weighted combination of the vehicle heading error, the waypoint heading error, and the cross-track error.

The autonomous navigation system may be used with a surface drilling rig for mining operations. The autonomous navigation system may be used in mining operations to drill blast hole patterns.

The autonomous navigation system may include a vehicle location sequencer that determines an ordered sequence of desired vehicle locations, and wherein the waypoints computed by the path planner specify a path between desired vehicle locations. The sequence of desired vehicle locations may correspond to a sequence of planned drill holes in a blast hole pattern.

The path planner may determine a path between desired vehicle locations using a cubic Bezier spline. A path chosen by the path planner may be required to satisfy specified path constraints such as minimum turning radius, obstacles and/or boundaries.

The path planner may also include a state lattice search system. Where a valid path from one location to the next cannot be determined, the path planner may expand its search space by contemplating a set of primitive expansion paths to a plurality of nodes defining nearby reachable vehicle configurations (e.g. location and heading). The primitive expansion paths may be generated using cubic Bezier splines.

The path planner may also use a multidimensional occupancy grid representation for path verification.

A method for autonomous navigation of a tracked or skid-steer vehicle in accordance with another aspect of the present invention includes:
  determining a path plan including a series of computed waypoint locations specifying a path to follow;
  measuring the vehicle location and velocity;
  computing vehicle speed and yaw rate setpoints based on the measured vehicle location and velocity and the locations of a plurality of neighbouring waypoints;

generating left and right track speed setpoints from the speed and yaw rate setpoints; and controlling the vehicle left and right tracks in accordance with the left and right track speed setpoints.

Computing the vehicle speed setpoint may be based on a calculation of trajectory curvature determined at the waypoint nearest to the vehicle.

Computing the vehicle speed setpoint may also use a measurement of the vehicle speed and yaw rate, and the maximum allowed vehicle speed and yaw rate.

Computing the vehicle yaw rate setpoint may be based on a vehicle heading error defined by the angular difference between the vehicle heading and the vector defined by the vehicle position, the current tracking waypoint and the following waypoint.

Computing the vehicle yaw rate setpoint may also be based on a waypoint heading error defined by the angular difference between the vehicle heading and the desired heading at the current tracking waypoint, wherein the desired heading at a waypoint is defined as the vector that connects the waypoint and its successive waypoint.

Computing the vehicle yaw rate setpoint may also be based on a cross-track error defined by the distance between the vehicle position and the planned path. The cross-track error may be defined by the distance between the vehicle position and the nearest point from a fine discretization of an interpolated path through the waypoints.

The vehicle yaw rate setpoint may be computed on the basis of a weighted combination of the vehicle heading error, the waypoint heading error, and the cross-track error.

The autonomous navigation method may be used with a surface drilling rig for mining operations. The autonomous navigation method may be used in mining operations to drill blast hole patterns.

The autonomous navigation method may include a vehicle location sequencing step that determines an ordered sequence of desired vehicle locations, wherein the waypoints computed in the path plan specify a path between desired vehicle locations. The sequence of desired vehicle locations may correspond to a sequence of planned drill holes in a blast hole pattern.

Determining a path between desired vehicle locations may be accomplished using a cubic Bezier spline. A path chosen may be required to satisfy specified path constraints such as minimum turning radius, obstacles and/or boundaries.

Determining a path plan may also include use of a state lattice search space. Where a valid path from one location to the next cannot be determined, the search space may be expanded by contemplating a set of primitive expansion paths to a plurality of nodes defining nearby reachable vehicle configurations (e.g. location and heading). The primitive expansion paths may be generated using cubic Bezier splines.

Determining a path plan may also include use of a multidimensional occupancy grid representation for path verification.

A path planning system for an autonomous vehicle having actuators for moving and steering the vehicle in accordance with another aspect of the present invention includes:

a path planner that receives a series of desired locations and generates path data defining a feasible path for the vehicle to traverse the series of locations;

sensors that monitor a location and heading of the vehicle;

a controller that receives the path data and the monitored location and heading of the vehicle and determines setpoints for the actuators such that the vehicle follows the path.

The path data may comprise a series of waypoints and wherein the controller determines a desired vehicle heading that is a weighted average of:

a first angle between the vehicle heading and a first vector defined by the vehicle location and a current waypoint; and a second angle between the vehicle heading and a second vector defined by the vehicle location and a subsequent waypoint in the series of waypoints. The weighted average may depend on a distance between a current vehicle location and an earlier waypoint in the series of waypoints. A weighting of the second angle increases as the distance increases.

A method for planning a path for an autonomous vehicle having defined constraints in accordance with another aspect of the present invention includes:

receiving a starting location and an end location;

generating a path that connects the starting and the end locations;

if the path does not satisfy the defined constraints, applying a state lattice search in which a search space is expanded using a set of primitive expansion paths to a plurality of nodes defining nearby reachable vehicle configurations.

The present invention may be used in combination with other controllers or control mechanisms. For example the autonomous vehicle may have one or more environment sensors to detect obstacles in the path of the autonomous vehicle. The controller or control mechanism may take action in response to the detection of an obstacle, which may include providing a path to avoid the obstacle, or ceasing movement until the obstacle has been dealt with by operator control.

Many other possible features and aspects will become apparent from the detailed description which follows.

BRIEF DESCRIPTION OF THE DRAWINGS

The following description explains details of the invention to enable it to be more fully understood in the context of an embodiment thereof, also referring to the illustrations in the accompanying drawings in which.

DETAILED DESCRIPTION

Due to the remoteness and potential hazards at mine sites, it is desirable to apply automation to achieve higher efficiency and safety. Central to mining operations is a surface drilling rig. This tracked vehicle drills multi-meter-deep holes into the ground that are subsequently blasted to extract ore. Drill hole positions are carefully planned in regular patterns according to the mine layout and in-ground geology. Embodiments of the invention are implemented as path planning and navigation systems for a tracked vehicle, such as a surface drilling rig. The following detailed description focuses on these embodiments. However, other embodiments of the invention are implemented as path planning and navigation systems for other vehicles, for example, but without limitation, wheeled vehicles.

Figure 1:
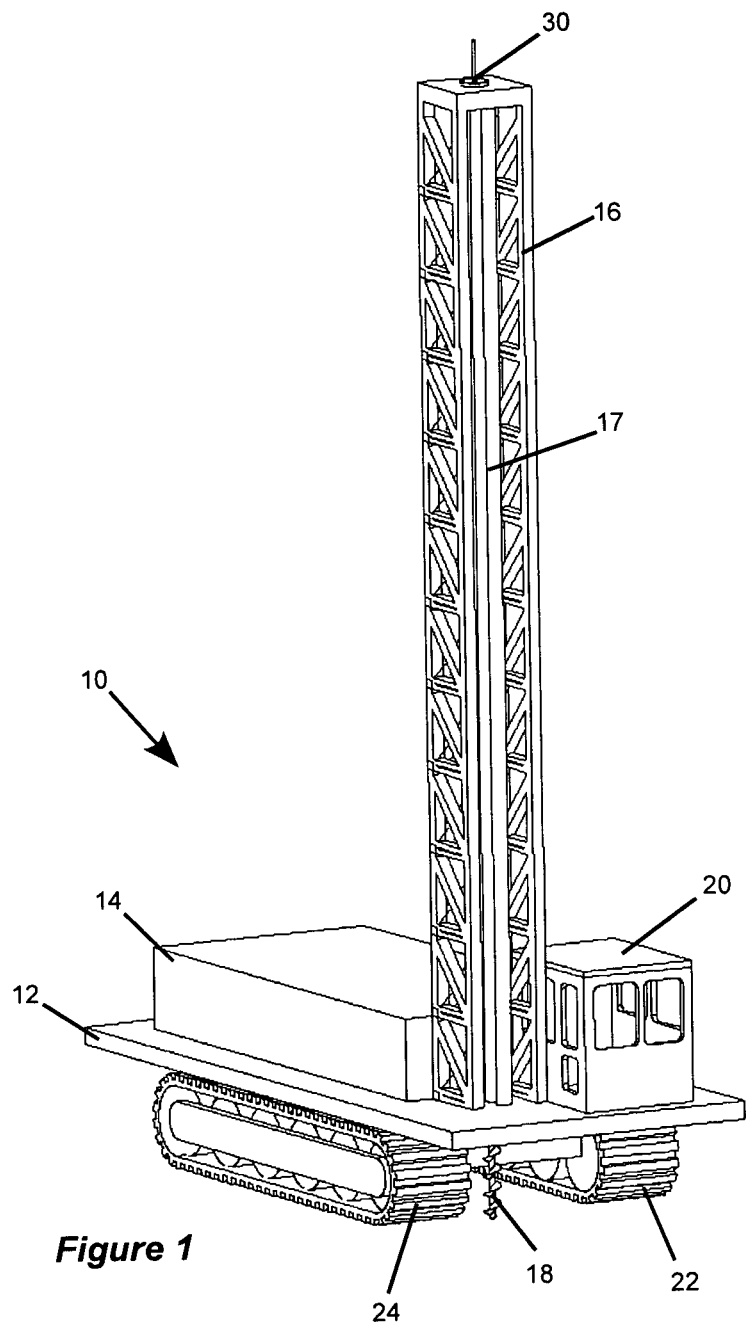
FIG. 1 illustrates a surface drilling rig vehicle.

A surface drilling rig vehicle 10 is shown in FIG. 1. The drill rig vehicle 10 as shown in the drawing has a large chassis 12 carried on left and right tracked conveyances 22, 24. The chassis 12 supports the engine and other essential mechanical equipment 14 toward the rear of the vehicle, whist at the front is a control cabin 20 and elongate upright drill mast 16. The drill mast supports an upright drill shaft 17 which extends down through the chassis 12 and terminates with a drill boring tool 18 beneath the vehicle. Although not shown in the drawings, some surface drilling rigs provide for adjustable angular movement of the drill mast with respect to the vehicle chassis enabling angled holes to be drilled in the ground.

In use, the drill rig vehicle moves over the surface of an open-pit mine on the tracked conveyances 22, 24 driven by the engine 14. As is usual for tracked vehicles, directional control is by skid-steering, wherein the relative rotation of left and right tracks is altered to change vehicle direction. At a chosen drilling location the vehicle is positioned with the drill boring tool over the desired ground location and the drill mast angle is adjusted to the desired angle (e.g. vertical). The drill rig is then operative to drill a hole in the ground by using the engine 14 to drive the drill boring tool and shaft into the soil/rock to a desired depth. When the hole is complete the vehicle is moved to the next chosen drilling location within a predetermined drill hole pattern.

In theory or under ideal conditions a tracked vehicle is capable of relatively high manoeuvrability, for example turning on the spot by running the tracks in opposite directions. However, in practice it is often prudent to avoid such manoeuvres with a large machine on an uncertain surface as in open-cut mining. When operating such a vehicle autonomously, it is possible to specify a minimum turning radius for operation of the vehicle to minimise deleterious effects of the tracks on the ground. A minimum turning radius places certain constraints on the possible paths the vehicle can follow, however.

The automation of a surface drilling rig for the purposes of blast hole pattern drilling can be considered in three modules: leveling, drilling and tramming. The leveling function is concerned with ensuring the drill rig mast extends at an angle appropriate to form the desired drill hole. For example, if the vehicle chassis is not level at the chosen location due to terrain features, adjustment of the mast angle can be used to maintain a vertical drill shaft orientation. The drilling function concerns formation of the blast hole itself, by driving the drill boring tool into the ground to the correct depth at the chosen vehicle location and mast angle. This following description focuses on the autonomous tramming function which involves movement of the drill rig from one hole location to the next according to the predetermined drill hole pattern.

Automated tramming of the drill rig vehicle involves three main tasks. First, given a drill pattern, determine the appropriate ordering of drill holes. Second, based on the computed hole ordering, determine a trajectory that connects all drill holes in the pattern. Finally, tram the drill based on the planned trajectory. In achieving these tasks, two major technical difficulties present: 1) planning for efficient traversable paths that cover the entire drill-hole pattern, and 2) performing path tracking accurately to maintain a uniformly low tracking error and achieve a high final stopping accuracy. A controller for autonomous drill tramming capable of planning and realizing accurate path tracking is described in the following including details of the software architecture and module functions for the controller.

The overarching goal of the autonomous tramming system is to safely navigate the drill through drill-hole patterns. This entails a number of sub-requirements and behaviors. The autonomous tramming system needs to determine a traversable path that covers all holes in a pattern while maintaining tight spatial constraints, which include avoiding various obstacles, in the field. It also must follow the planned path precisely and stop at designed holes accurately so that the actual pattern of drilled holes closely matches the planned pattern. These tasks may be intuitive to an experienced human drill operator, but it requires a great amount of research and engineering to properly encode into software and controlling systems for autonomous operation.

Difficulties in controlling such a large machine arise from such things as vibrations resulting from the drill's suspension compliance, high forces, friction, and large inertia in the vehicle's movements. In particular, for greater satellite visibility in deep pits, the GPS antennas rest atop the drill mast. As a consequence, large impulses and accelerations lead to mast sway of ~30 cm at the tip, which without control can cause positioning errors. Accordingly, a vehicle control system and architecture using waypoint methods and lead-lag control methods is presented for autonomous vehicles. In comparison to light-vehicle operation, adaptations look-ahead, terrain, and machine vibration compensation are included. This architecture has been successfully fielded on a Terrex Reedrill SKSS-15 used in production iron ore mining in Western Australia. The Reedrill SKSS-15 is approximately 98 tons in weight, 13 meters wide and 17 meters tall to the top of the drilling mast. Experimental results show improved accuracy in drill mast placement over manual operations with 7 cm variance for travel spans of 5-80 m. Further experimental results follow the description of technical features.

Figure 2:
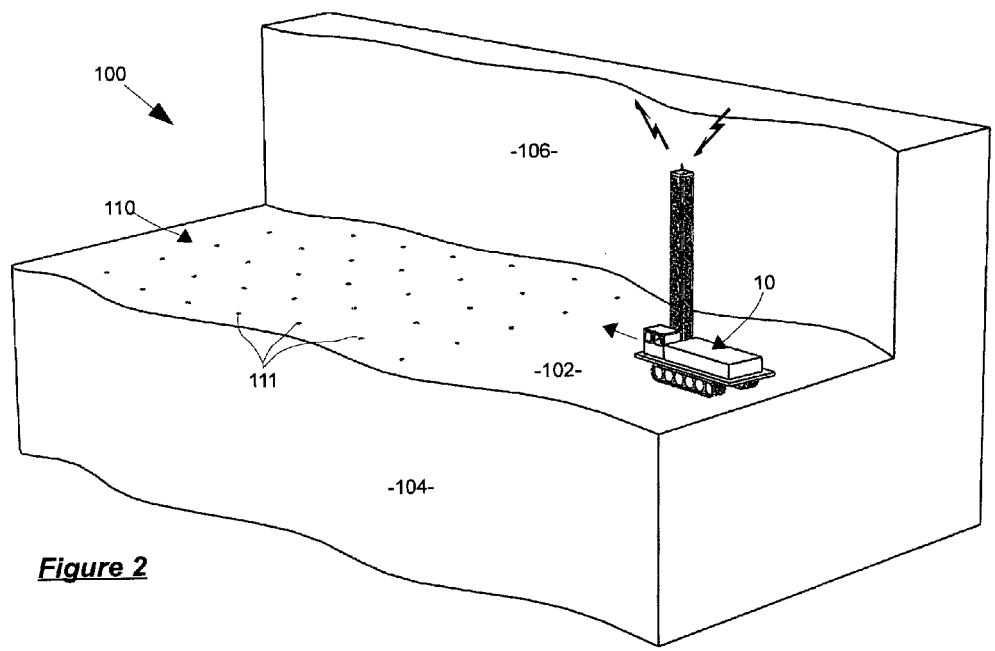
FIGS. 2 and 3 diagrammatically illustrate a surface drilling rig in an open-cut mining scenario.

FIG. 2 diagrammatically illustrates the drill rig vehicle 10 on the surface of a shelf 102 of an open pit mine 100. The shelf 102 has a substantially horizontal surface but is bounded on one side by a vertical drop-off 104 and on the other side by a rising cliff-face 106 which provide clear constraints to vehicle movement. In order to access ore-containing rock beneath the surface of the shelf 102 it is desirable to bore a pattern 110 of individual blast holes 111 which can be filled with explosives. The choice of shelf and region to be blasted, the drill pattern, and the placement of individual holes may be determined by mine planners and engineers on the basis of many known factors such as the mine topography, rock geology, etc. For example, harder rock may require blast hole locations to be closer to one another.

Figure 3:
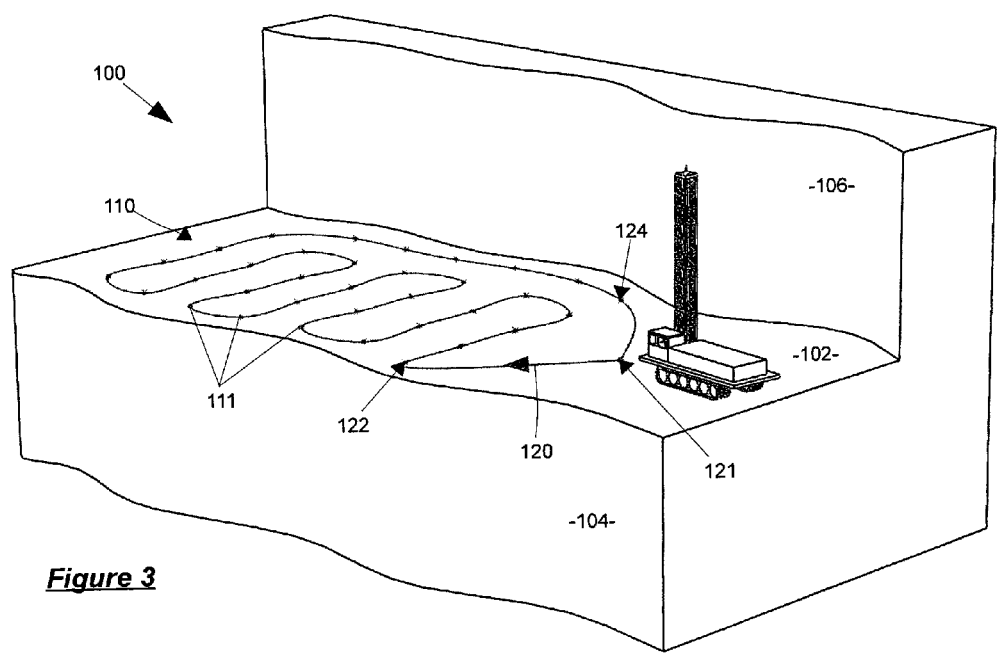

Once the location of each planned drill hole 111 for a drill pattern 110 has been determined, the order in which the holes will be drilled can be selected. The sequence order for drilling holes in a pattern may be selected having regard to varied factors. For example, a predetermined starting location and/or ending location may be specified, with preference for the shortest direct path length. FIG. 3 shows the drill pattern 110 in which the planned drill holes have been placed in a sequence, incorporating each individual hole location 111, beginning with location 122 and finishing with location 124. An exemplary path 120 is shown interconnecting each hole location in the sequence, starting and ending from a predetermined location 121. The path is designed to avoid obstacles and boundaries, such as the vertical terrain 104, 106, and satisfy one or more specified constraints, for example on vehicle turning radius.

Figure 4:
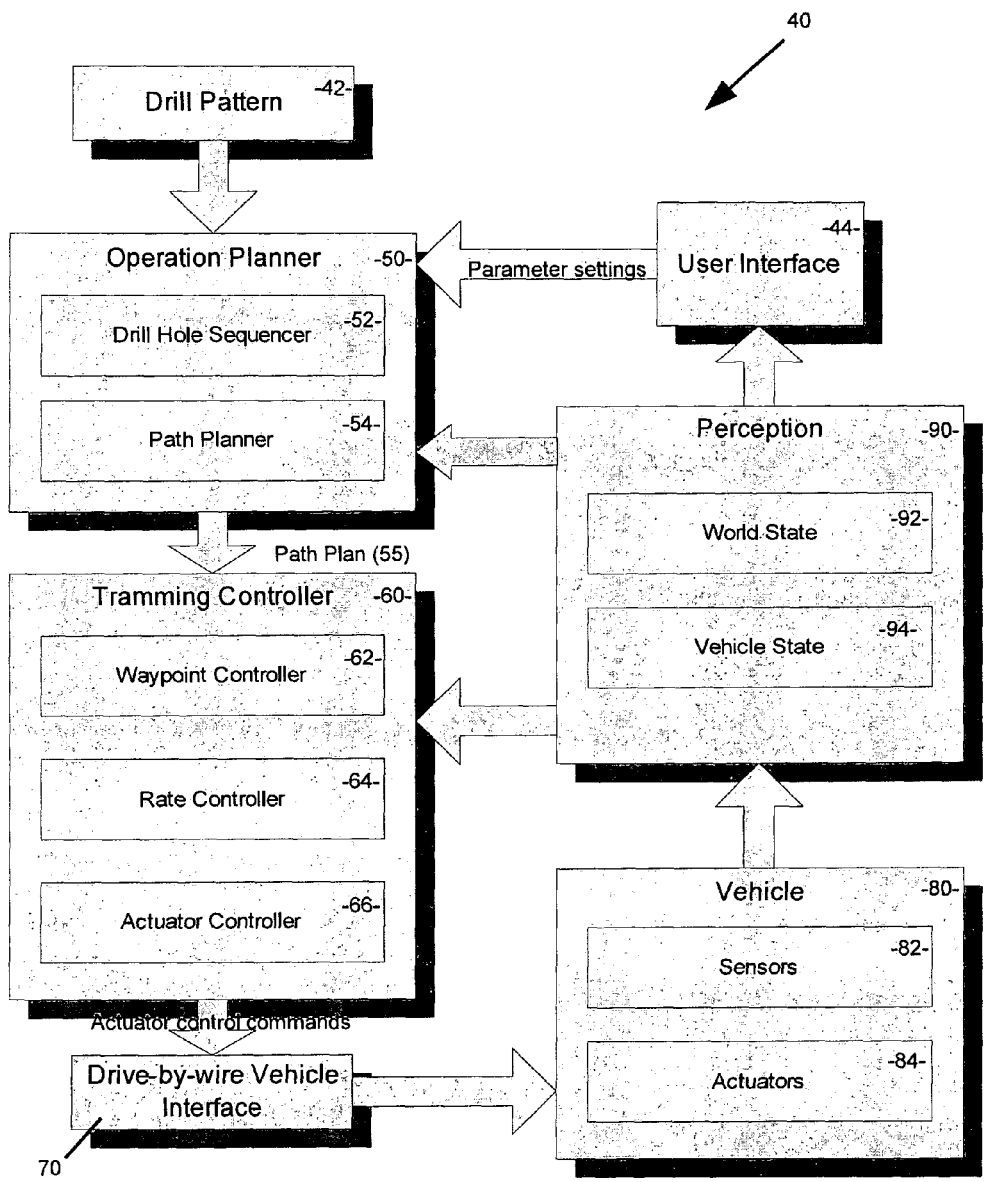
FIG. 4 is a block diagram illustrating an automated vehicle control system architecture.

An autonomous vehicle control system architecture for navigating a surface drilling rig vehicle in circumstances as outlined above is shown in block diagram form in FIG. 4. The overall control system structure 40 can be viewed as a loop of messages. The structure and function of the control system and its various components are described below. The hardware system that supports the architecture of FIG. 4 may be located on the autonomous vehicle or it may be distributed such that some components or modules of the architecture are physically located on the vehicle while other components or modules are located elsewhere. For example, the tramming controller 60 is preferably located on the vehicle and the operation planner 50 may be located on the vehicle or at a remote server from which the path plan 55 is communicated to the tramming controller. Similarly, the perception model 90 and the user interface 44 may be implemented on the vehicle and/or distributed. There may be multiple displays at different locations to enable several users to monitor the activity of the autonomous vehicle. The architecture 40 may be embedded in a larger system, for example the autonomous mining system described in PCT/AU2009/000265, "Method and system for exploiting information from heterogeneous sources", filed on 4 Mar. 2009.

An operation planner 50 receives drill pattern data 42 as input, as well as user input parameter settings from a user interface 44. The drill pattern data 42 includes coordinates defining the plurality of planned drill hole locations 111 in a drill pattern 110 (FIG. 3). Output of the operation planner 50 is a vehicle path plan 55 in the form of a list of waypoint coordinates.

The operation planner 50 has two sub-components: a drill-hole sequencer 52 and a path planner 54. The drill-hole sequencer 52 is responsible for generating an adequate drilling order for all holes in a drill pattern 110. The order in which the drill-hole sequencer 52 arranges the planned drill holes 111 (see FIGS. 2 and 3) may be determined having regard to various operational considerations, such as a selected starting location, ending location and/or preference for interconnecting path characteristics. An ordered list of drilling coordinates including every hole in the drill pattern data 42 is the product of the drill hole sequencer.

Given a drill hole sequence, the path planner 54 is responsible for computing traversable paths that connect all holes. In its simplest form, the path planner takes a vehicle starting configuration, which contains the starting position and heading, and an ending configuration, which contains the ending position and heading, and generates a trajectory, which is an ordered list of waypoints. Obstacle avoidance and tramming field boundary perimeter verification are also incorporated.

Outputs of the path planner are waypoint lists. In other arrangements the path planner may issue trajectory data in other formats. However, not all information in a waypoint is filled (planned) by the path planner. Namely, the instance speed of a waypoint (e.g. the planned speed of the vehicle at that waypoint) is not determined by the path planner. The main reason for this is the path planner has only taken spatial constraints into consideration. In general, no temporal regulation is consulted by the path planner. However, in some planning methods, for example the occupancy grid method described below, temporal information may be taken into account in the path planning.

The path plan 55, which in one arrangement includes an ordered waypoint list, is provided to a tramming controller module 60, which is responsible for executing the path plan. The outputs of the tramming controller 60 are actuator control commands which are sent to a drive-by-wire hardware interface 70. The vehicle hardware interface 70 translates the control commands into control signals which are executed by hardware actuators 84 fitted to the vehicle 80. Feedback is enabled by vehicle sensors 82 which constantly collect information that is used to maintain a model of the operating environment 92 (or "world state") and vehicle internal states and processes 94.

The sensors 82 include a satellite positioning system (GPS) which uses a receiver antenna 30 (FIG. 1) atop the drill rig mast 16. Sensor data not from the vehicle may also be used in developing and maintaining features of the operating environment model such as the overall terrain, boundaries and obstacles. Information about the vehicle state and local environment modeled from sensor data is provided to the operation planner 50, tramming controller 60 and the user interface 44. The vehicle state and environment information may include vehicle location, heading and speed, and the locations of local obstacles and boundaries. This information is utilized by the tramming controller to control the drill rig vehicle and the human user to monitor the drill progress.

The tramming controller 60 includes three hierarchical sub-controllers: a waypoint controller 62, a rate controller 64, and an actuator controller 66. The tramming controller is designed such that the actuator controller regulates the speed of the two vehicle tracks; the rate controller regulates the vehicle velocity and the turn rate; and the waypoint controller maintains the tracking of planned trajectories. Due to the skid steering nature of the drill rig vehicle, velocity and yaw rate are chosen as the two main control parameters because they directly relate to the vehicle driving commands.

Unlike autonomous vehicles designed for general purpose road driving, autonomous drill tramming has a specific set of requirements. In comparison to road vehicles, which work in a highly dynamic environment (e.g. roads), the working environment for a blast hole drill rig vehicle is relatively static. In a typical drill operation site, all on-site traffics are tightly controlled. There hardly is any moving obstacle in the field. Therefore there is no demand for high speed traversing and high maneuverability. On the other hand, due to the tight spatial constraints on drill sites and to ensure the accurate positioning of drill holes, drill tramming requires considerably higher control accuracy than road vehicles. This requirement translates to tight error tolerances on path tracking and final vehicle positioning.

Aspects of the autonomous vehicle control system are explained at greater depth hereinbelow. In particular the path planner 54 and tramming controller 60 are described in additional detail.

Path Planner

Generally speaking, the problem of path planning can be considered in two aspects. One form of path planning focuses on generating long paths and is mainly concerned with taking the vehicle from one point to another, while having relatively high tolerance on path tracking performance. Another form of path planning focuses on generating short trajectories which emphasize the traversability of trajectories and ensure high accuracy on path tracking. Both methods are capable of avoiding obstacles and regulating path properties, e.g., maximum curvature. However, the two approaches are derived from two different viewpoints.

The path planning problem faced in automated blast hole pattern drilling has the following characteristics: 1) planning paths in a relatively less dynamic environment; 2) planning relatively short paths; 3) having low constraints on the amount of computation; and 4) requiring refined constraints on vehicle positioning and heading.

One approach to path planning adopts an occupancy grid based searching mechanism. Occupancy grid mapping represents the environment with a grid of fixed resolution. The occupancy grid is a multidimensional grid that maintains stochastic estimates of the occupancy state of each cell. Each cell stores the probability of being occupied or free; in the present instance a binary representation is used.

To accommodate for vehicle heading requirements, we discretize both the ground surface, which is represented as a 2D plane, and the vehicle heading into 3D cube cells. The search space can be viewed as a 3D cube, in which the X-Y plane represents the vehicle coordinates and the Z axis represents vehicle headings. Every cell in the cube connects to six cells among the 26 adjacent cells. The connectivity of each cell is defined as the six neighbouring cells in front and behind the centre cell, where two of them are in the level (the Z-axis discretization) above the centre cell; two of them are in the same level as the centre cell; and two of them are in the level below the centre cell.

Figure 5A:
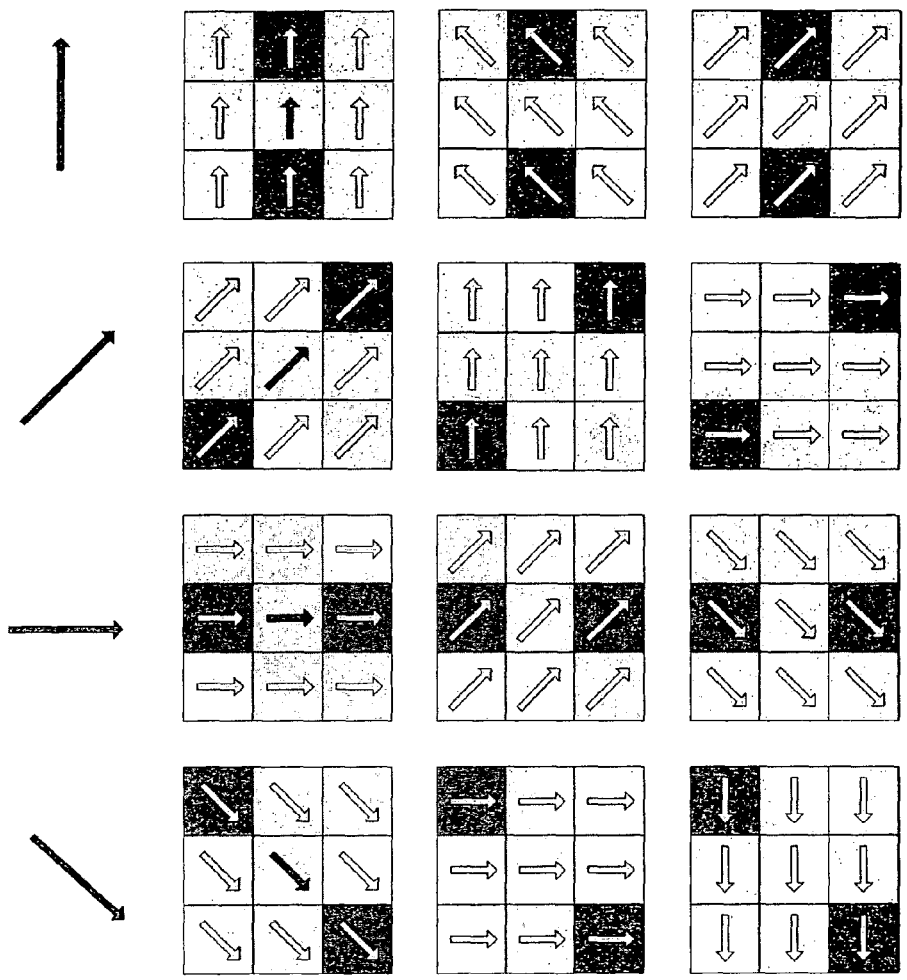
FIGS. 5(a) and 5(b) illustrate neighbour definitions for vehicle path planning using a 3-D grid search space.
Figure 5B:
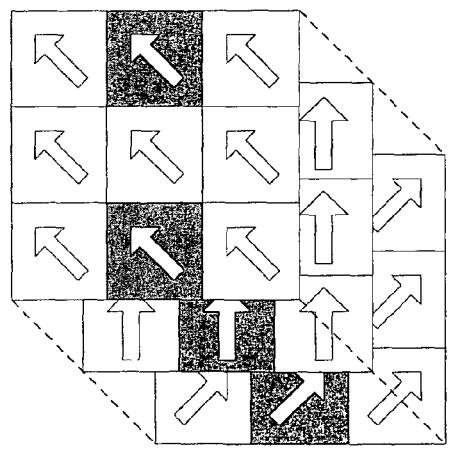

FIG. 5(*a*) illustrates neighbor definitions for vehicle path planning using 3D occupancy grid search. Only half of the total eight initialization configurations are shown as the other four are symmetric to configurations presented. The left-most column indicates four of the eight possible initial heading configurations. The other three columns show the reachable neighbour cells from each initial configuration. The shaded arrows indicate initial headings, the shaded cells show reachable configurations. For instance, the first row reads as: starting with a position that heads north, the six reachable positions are cells either directly in front of or behind the current position, with headings equal to north, north east, and north west respectively. Conceptually, the eight set of grids are piled up to form a 3D grid in the manner illustrated in FIG. 5(*b*). A trajectory can then be represented as a 3D curve that goes through connected neighbour cells.

This conceptually simple search space formulation allows a very convenient way to specify the starting and the desired final vehicle headings. Various path constraints can be easily represented. For instance, obstacles can be marked as all cells with the same coordinates regardless of their orientations; areas that can only be approached from certain directions can be marked as cells representing orientations that violate the approach rule of the area. Path properties such as the allowed minimum turning radius can be indirectly regulated through adjusting the discretization resolution of the heading axis.

Introducing the Z axis to represent the vehicle heading in an occupancy grid brings a considerable amount of expressing power for path constraints. A further step can be incorporating vehicle velocity related path constraints into the representation. Since the maximum allowed turn rate depends on the vehicle velocity, it is useful to formulate this dependency into the search space. For instance, cells in the 3D grid can be categorized into different groups based on speeds they represent. Cells in different categories have different meanings in their representations, e.g., high speed cells have finer heading resolution than low speed cells.

Another approach to path planning formulates the search space in a more continuous fashion; and vehicle dynamics are directly taken into consideration at the planning phase. Instead of searching through cell propagation in a grid, this approach formulates the search space using state lattices, which are discretized sets of reachable configurations. Similar to the previous approach, A* search is then used in this new search space. Search spaces formed by state lattices usually have a higher branching factor and a lower search depth than spaces formed by occupancy grids. However, to facilitate effective heuristic search, sometimes extra care is needed to define the heuristic function, as the commonly used Euclidian distance may be inefficient and various pre-computed look-up-table based heuristic functions may prove to be more appropriate.

Figure 6:
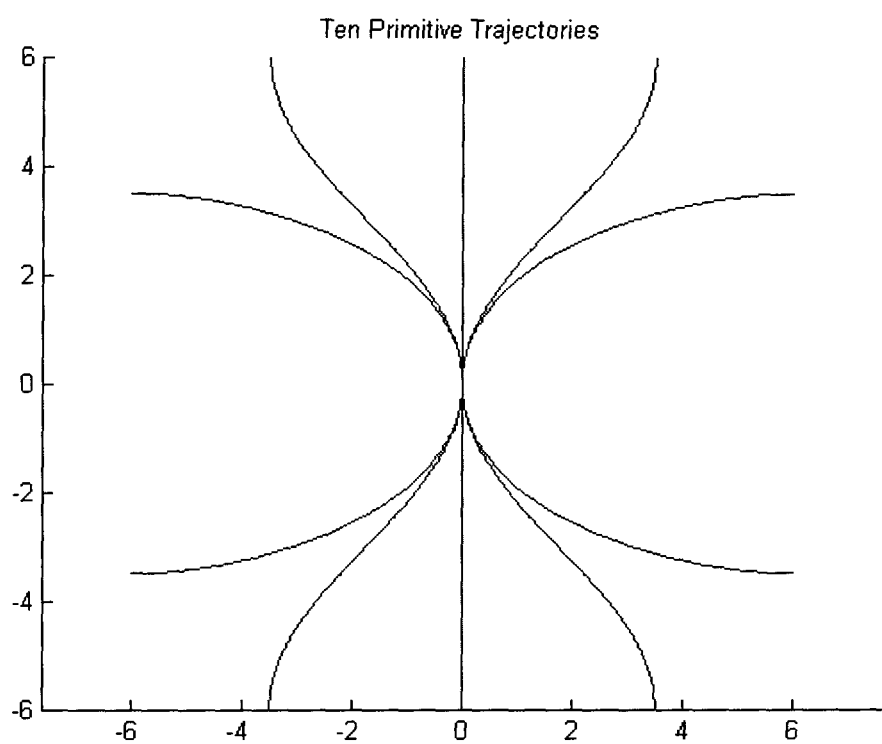
FIG. 6 illustrates ten primitive trajectories for vehicle path planning with a state lattice search space.

In the state lattices path planning solution, the search space is formulated with continuous vehicle manoeuvres. The resulting search graph is composed of vehicle configurations as nodes and primitive trajectories as links. FIG. 6 illustrates the ten primitive trajectories selected for the present application, with units shown in meters. The originating node is at location (0,0).

Unlike some state lattice implementations, in which the primitive trajectories are usually defined by discretizing the reachable configurations based on the vehicle kinematics, primitive trajectories may be based on a functional study of drill tramming trajectories in production operation. This results in a set of trajectories that is a subset of all reachable configurations. This selection base is validated on the observations that drills are tracked vehicles, which have complete track output separation and run at low speed. Unlike most wheeled vehicles, which have their manoeuvrability limited by vehicle dynamics, the dominating factor for drill trajectory regulation comes from drill operation procedures. The primitive trajectories in FIG. 6 are examples of trajectories derived from such a functional study.

In addition to defining primitive trajectories according to drill operations, we employ a more flexible approach for trajectory generation. One inherited limitation of the standard state lattices approach is the dilemma of the search branching factor and the coverage of the search space. Once the vehicle configuration discretization is involved, there is a compromise between the number of primitive trajectories and the coverage of the vehicle configuration space. With fewer primitive trajectories, a faster search is possible due to the smaller branching factor. However, conversely, there are more unreachable configurations in such a system. In order to ensure greater coverage, more primitive trajectories are required, and a higher burden is added to the computational cost that is incurred by evaluating all possible path compositions. One method to alleviate this issue could be to adopt a multi-resolution approach. An alternative approach that may be equally effective is the method described herein, in the context of drill tramming.

Ten primitive trajectories are defined, as shown in FIG. 6, each generated and represented using a cubic Bezier spline. However, instead of generating primitive trajectory compositions until the path is found, the path planner 54 first generates a cubic Bezier spline path from the current search node to the final destination. Only if this path is invalid, due to the violation of vehicle dynamics constraints or intersection with obstacles, does the path planner expand the current search node with the ten pre-defined primitive splines. This strategy ensures that there is no vehicle configuration error incurred at the path planning stage due to the search space discretization. Given a set of primitive trajectories that is complete enough, this strategy also fills all holes that are created because of the search space discretization with a small amount of search node expansion.

Figure 7:
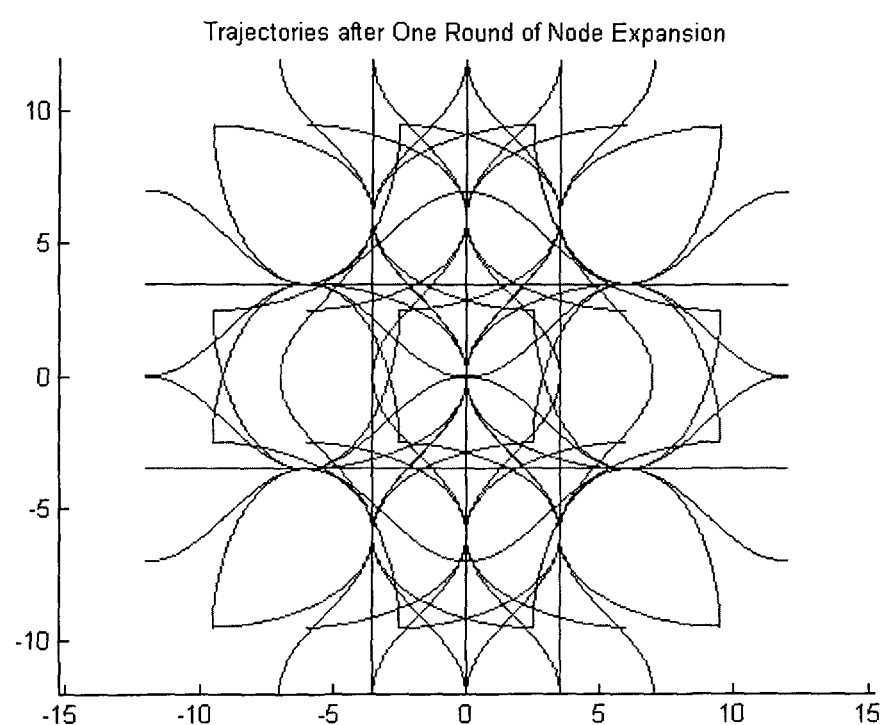
FIG. 7 shows state lattice search trajectories after one round of node expansion.
Figures 8, 9:
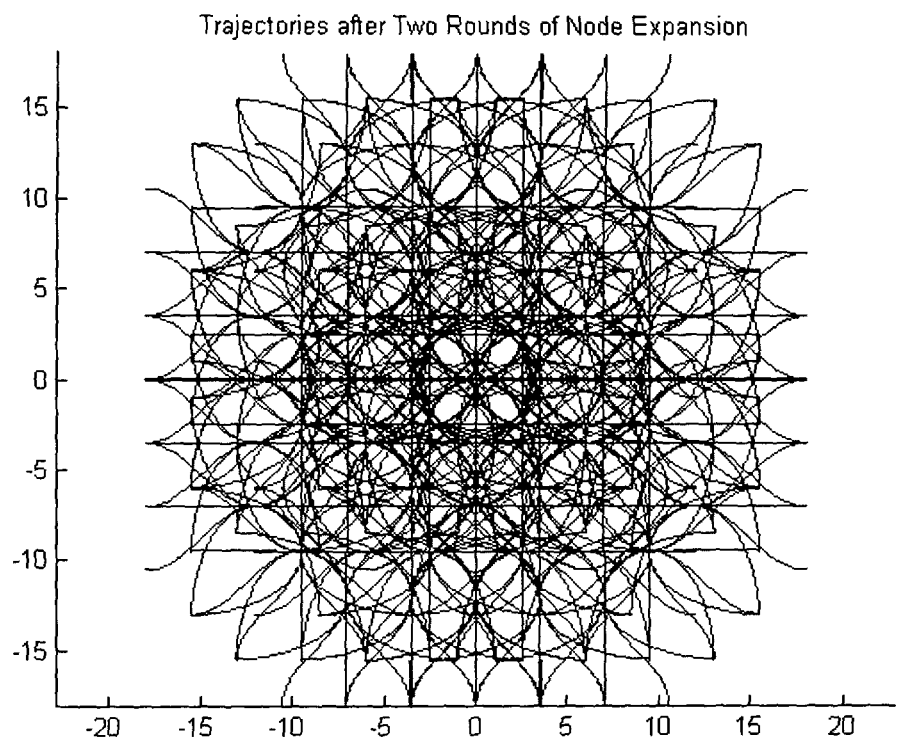
FIG. 8 shows state lattice search trajectories after two rounds of node expansion.
FIG. 9 shows a table defining end nodes of the ten primitive path planning trajectories.

FIG. 7 shows the trajectories after one round of node expansion, and FIG. 8 shows trajectories after two rounds of node expansion. FIG. 9 contains a table defining end nodes of the ten primitive trajectories shown in FIG. 10, which have straight-line segment endings.

The core of this path planning approach is the cubic Bezier spline generator. This spline generator takes a starting configuration and an ending configuration as its inputs. Based on the starting configuration and the ending configuration, two more points are estimated. Taking these four points as the input and using the standard cubic Bezier spline formula, a spline represented by discretized points is generated.

The estimated intermediate points are determined by the path planner as follows. Given a Starting Point of $P_0$ with heading $\theta_0$, and an Ending Point of $P_3$ with heading $\theta_3$ the two points to be estimated are designated $P_1$ and $P_2$. Here both $P_0$ and $P_3$ are vectors, where $P_0=(x_0, y_0)$ and $P_3=(x_3, y_3)$. The vector distance between $P_0$ and $P_3$ is equal to the vector $D=(P_3-P_0)$. Take $d=|D/3|$, which is a scalar equivalent to $d=\sqrt{((x_3-x_0)^2+(y_3-y_0)^2)}/3$, and create a vector $v=(d, 0)$. Rotating v by angle $\theta_0$ produces a vector $v1=(dx_{\theta_0},dy_{\theta_0})$, and $P_1=P_0+v1$. Similarly, rotating v by $\theta_3'=\pi-\theta_3$ produces $v2=(dx_{\theta_3},dy_{\theta_3})$, and $P_2=P_3+v2$.

This is a process that finds two points between the starting and the ending points that are in directions of the initial heading and the reverse of the final heading. The divide-by-three is rather arbitrary, however it is a value that the inventors have found to be usable for most of the considered cases. This quantity changes the shape of produced spline, and also impacts on the coverage of the search. Other alternatives for this quantity have been tried, such as instead of $d=D/3$ using $d=D/n$, where n is a number found dynamically and depends on $P_0$ and $P_3$, which minimize the amount of turning of the resulting spline. In experimental work to date it turned out such alternative setting does not yield any visible improvement.

In one arrangement a combined logic is deployed according to the following. If d is less than some threshold, CubicSplineExtension, then this $d=D/3$. Otherwise, $d=$CubicSplineExtension, which is a constant value of 5 in one arrangement. The idea is, when the starting and ending points are close, the method regulates the spline using the estimated distance, D. When the two points are far apart, then an absolute quantity is thought to work better as it may avoid the introduction of a giant arc into the planned path if the two points are distant and there is some amount of turning involved.

A hybrid graph search technique is then used to construct the path. The algorithm is outlined in the following (the notation xy is used to denote a path from x to y):

Initialize the search queue and the solution list (Create an empty search queue and an empty solution list)

Put the starting configuration, S, into the search queue; define an empty path that connects S to itself (SS is empty)

Until the number of elements in the solution list exceeds a certain threshold, do the following:

Dequeue a node, N, from the search queue (In the first iteration, N is S; SN is empty.)

Construct a Bezier spline, NE, that connects N and the ending configuration, E

If NE satisfies path constraints, then concatenate SN and NE, and store the concatenated path, SE, to the solution list Otherwise, store the path SN, which connects the starting position and the current node. Compute the ten neighbour nodes, T1, T2, ... T10, of N. Then, if NTx, where x ranges from 1 to 10, satisfies path constraints, enqueue Tx to the search queue. Tx contains the path information that connects the starting configuration to itself, STx.

Sort the solution list by either of the amount of turning or the length of each path Return the top path from the sorted solution list A trajectory is considered valid if it satisfies: 1) the minimum turning radius constraint, 2) no intersection with obstacle constraint, and 3) no exceeding the boundary perimeter constraint.

The path planner 54 has access to input data specifying the path terminals, which are starting and ending configurations, obstacle list, which is a list of obstacles and each obstacle is a coordinate with a radius (therefore all obstacles are circularly shaped), and perimeter list, which is an ordered list of coordinates that are vertexes of a polygon. The output of the path planner is presented in the form of a waypoint list.

Given relatively short path lengths, the final vehicle configuration can typically be reached within three or four levels of node expansion. A breadth-first search is used. The algorithm stops when a set of paths is found or it reaches a node expansion threshold. The path planner then evaluates all resulting paths based on criteria such as the path length and the amount of turning and returns the path ranks at the top in such evaluation.

The generation of a reversing path is similar to the generation of forward path, except when the Bezier spline generator is invoked the starting and ending headings are reversed.

There is one additional step before a path is returned after the path is generated using the spline generator. In practical terms, it is convenient for the returned waypoint list to satisfy a fixed point spacing constraint, i.e., for any two adjacent waypoints in the waypoint list, the distance between the two is fixed. The spacing is around half a meter. However, in order to maintain this spacing, the output of the spline generator is sampled at a higher frequency, as points in a discretized spline are not equally spaced. A down-sampling process is then used to ensure the consistency of waypoint spacing.

Since trajectories are generated using splines and are represented by discretized points, it is convenient to compute the amount of heading change between two adjacent points, given points are equally spaced. Since there is a direct mapping between the heading change and the turning radius, the path planner 54 may use this measure to evaluate the amount of turning for each trajectory, instead of the curvature.

Figure 10:
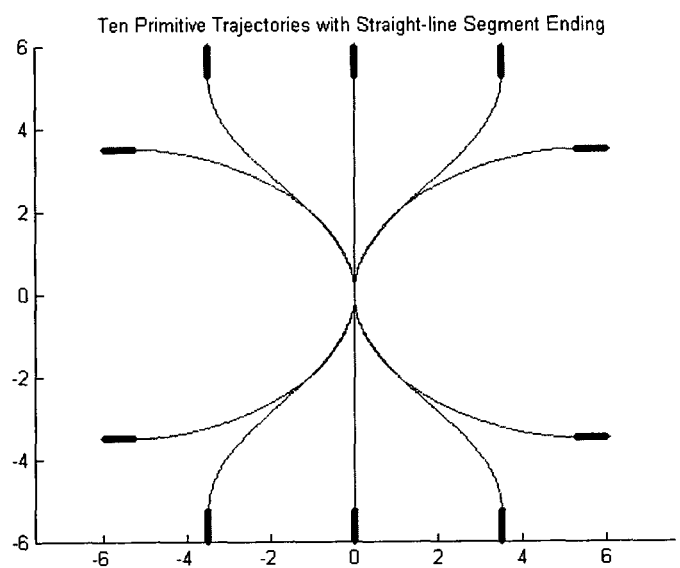
FIG. 10 illustrates the ten primitive trajectories with straight line segment endings.

In one arrangement, each of the primitive trajectories is composed of one potentially curvy cubic Bezier spline and one straight line segment. The purpose of the straight segment ending is to ease the trajectory tracking problem for the vehicle controller. FIG. 10 shows the ten primitive paths with the end-point adjustment illustrated as the darker line at the outer extremity of each of the trajectories. The table in FIG. 9 gives information about the terminal nodes of the 10 primitives shown in FIG. 10.

Two properties of the path planner were chosen on which to focus trials of experimental performance: 1) the coverage of all possible trajectories; and 2) the number of node-explorations before a path is found. The first property represents the completeness of the algorithm, whilst the second property represents the efficiency of the algorithm.

Figure 11:
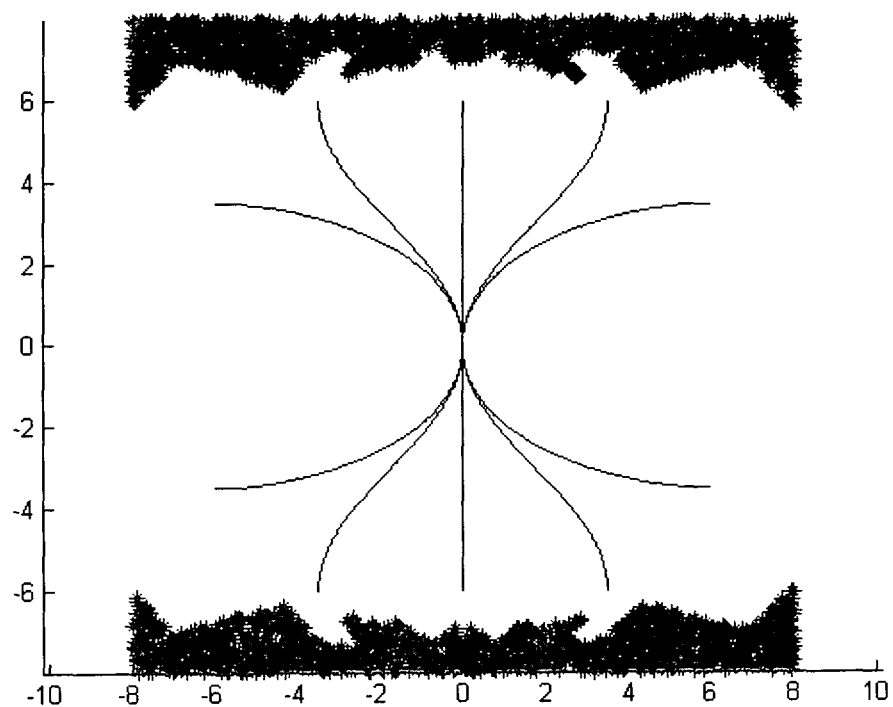
FIGS. 11 to 15 illustrate experimental results using state lattice path planning.
Figure 12:
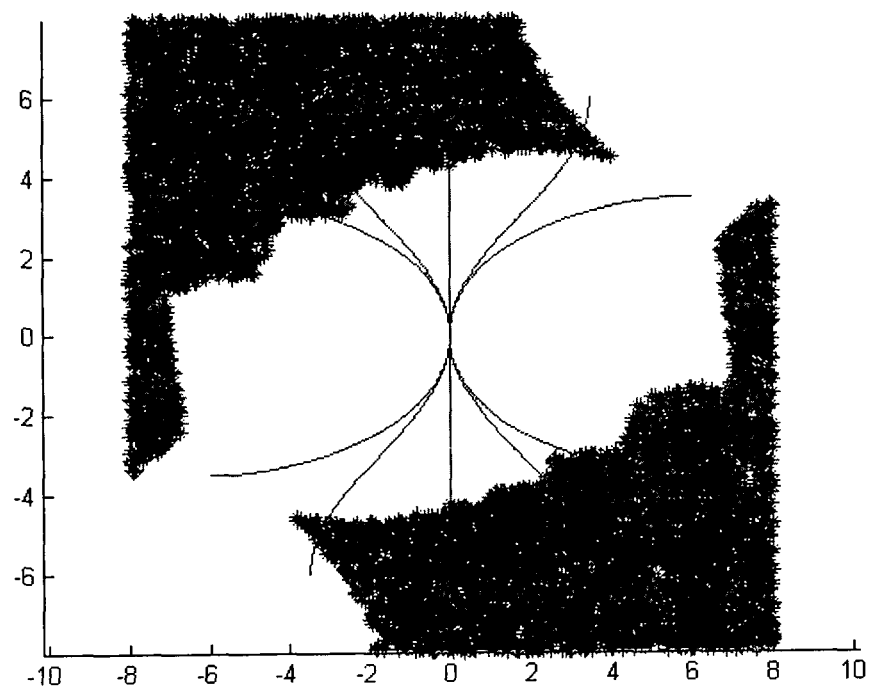

The Monte Carlo method was used to determine the path coverage. Referring to FIG. 11, the vehicle starts at location (0,0), with heading $\theta_{start}=0$. The shaded areas in FIG. 11 indicate reachable locations in the (−8:8, −8:8) square region with the final heading $\theta_{end}=\pi$ after one depth of search node expansion. FIG. 12 shows the reachable locations in the same square with the final heading $\theta_{end}=4*\pi/5$ and one depth of search node expansion. Twenty-thousand points were generated in each of the experiments. The allowed maximum turning radius for each trajectory is 2, the same as the maximum turning radius of the primitive trajectories.

Figure 13:
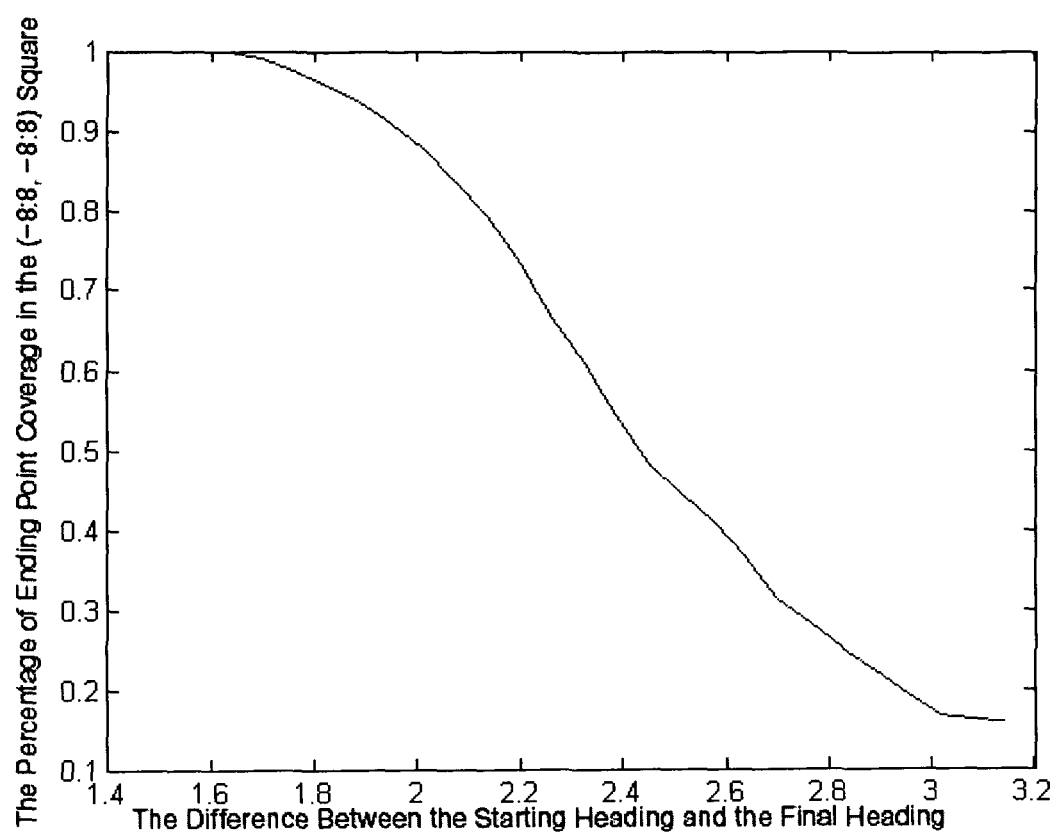

FIG. 13 shows the relation between the search coverage and the heading difference between the starting position and the final position. The x-axis is the difference between the starting heading and the final heading and the y-axis shows the percentage of end-point coverage. In this graph, it can be seen that the unreachable area grows rapidly as the heading difference approaches it.

Figure 14:
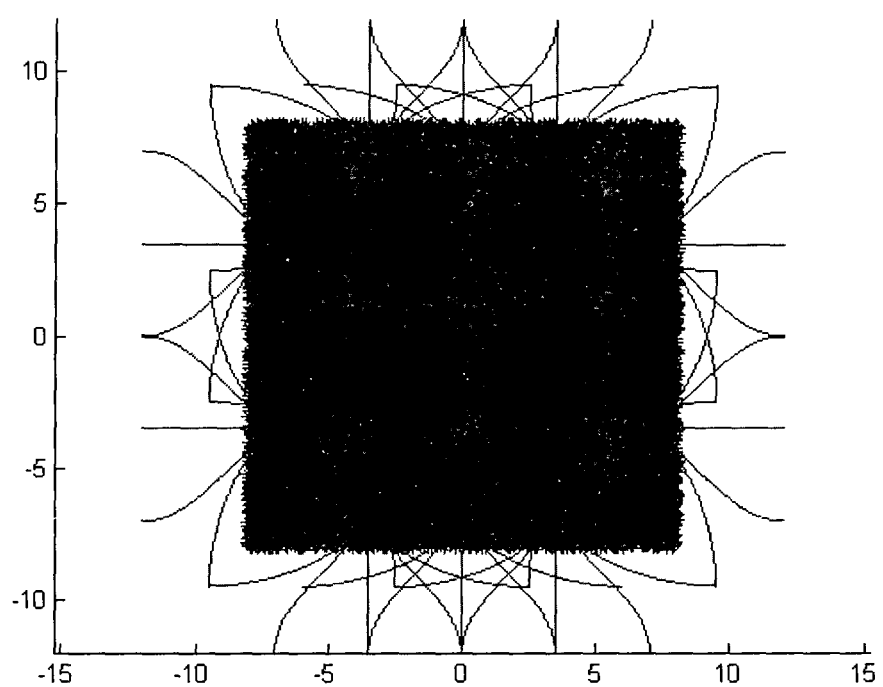

FIG. 14 shows the reachable region in the (−8:8, −8:8) square with the final heading $\theta_{end}=\pi$ after two depth of search node expansion. It can be seen that there is a 100% coverage in this setting.

Figure 15:
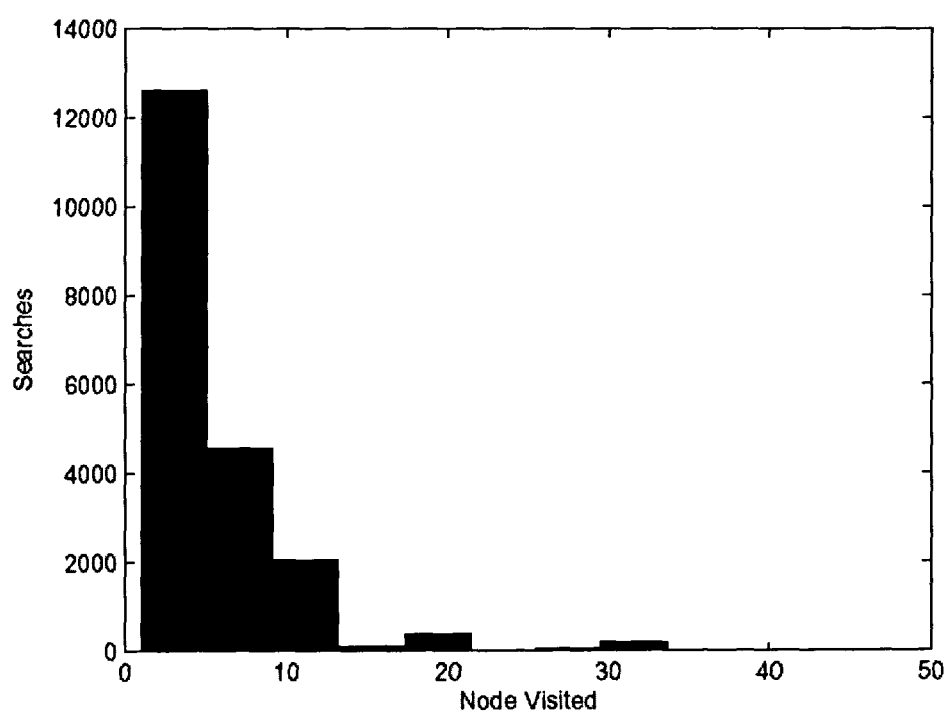

To test the search efficiency, we expand the ending point area to (−20:20, −20:20). Twenty thousand points are randomly generated in this area as destination points with random heading range from −π to π. The starting point is (0,0) and the starting heading θ is 0. FIG. 15 shows a histogram of the number of nodes examined before a path is found. Combined with the search coverage results presented above, it can be concluded that a simple breadth-first search is capable of producing desirable results for the present application.

Of the two approaches to path planning described above, the one utilizing a 3D grid search space is considered less desirable than the one that employs a modified state lattice search space, which is more efficient in the given circumstances. Both approaches, however, generate dynamically-feasible paths for the vehicle and are able to regulate vehicle heading in the planning. Even though the 3D grid is a less desirable search space for path planning, it provides a very convenient representation for verifying path constraints. Hence it may be used in conjunction with the state lattice approach to provide a complete solution that is both efficient in planning and path verification, i.e., plan a path in a state lattice search space and verify the path in a 3D grid.

Another possibility is the utilization of a heuristic look up table in the search phase so A* can be used to replace the breadth-first search. Even though the current implementation has proved effective in testing, it is possible that alternative circumstances may call for an increase in the resolution of the discretized search space by adding more primitive trajectories. Even though the ten primitive trajectories are selected after a careful study of daily drill tramming operations, it can still be seen that there are certain gaps in the path space that are not covered by the range of the path planner due to discretization. It is also worth noting that all other known state lattice based approaches have considerably more primitive trajectories in their configuration. However, significantly increasing the amount of primitive trajectories makes non-heuristic search prohibitively expensive in terms of computational cost. Therefore an effective heuristic guided search should be used in those circumstances.

Tramming Controller

Once a path plan has been determined by the path planner 54, the tramming controller 60 is the module responsible for the path following behaviour. The tramming controller and its three primary sub-components, the waypoint controller, rate controller, and actuator controller, are described in further detail hereinbelow with reference to FIG. 16 showing the control system with tramming controller represented by a block diagram 100.

The tramming controller includes three sub-controllers arranged in a hierarchical manner. It is designed such that the actuator controller 66 regulates the speed of the two vehicle tracks; the rate controller 64 regulates the vehicle velocity and the turn rate; and the waypoint controller 62 maintains the tracking of planned trajectories. Due to the skid steering nature of the drill rig vehicle, velocity and yaw rate are chosen as the two main control parameters because they directly relate to the vehicle driving commands.

Figure 16:
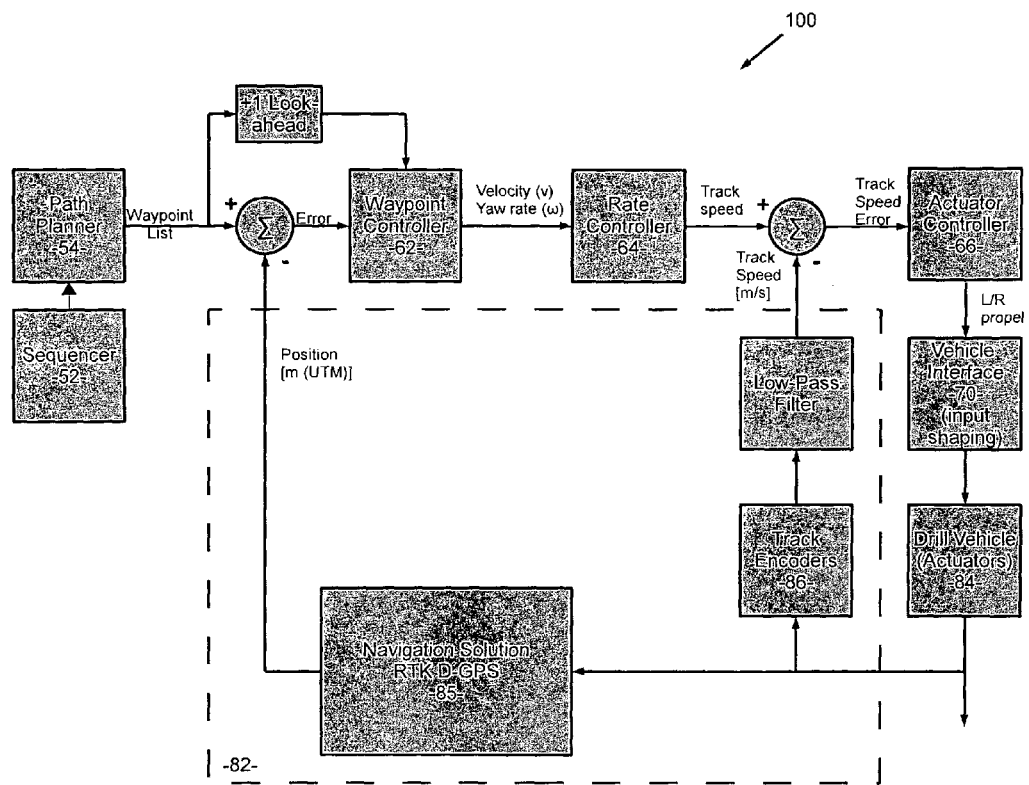
FIG. 16 is a block diagram of an automated vehicle control system for a surface drilling rig highlighting the tramming control function.

As illustrated in FIG. 16, the path planner 54 outputs waypoints to the tramming controller. At least one future waypoint is provided to the waypoint controller 62 in addition to a current waypoint. A summation block compares a measured vehicle location and heading with the desired location specified by the waypoint list. The output of the summation block is an error signal (including a cross track error, a vehicle heading error and a waypoint heading error as illustrated below with reference to FIG. 17A) that is input to the waypoint controller 62. The measured vehicle location and heading may be provided by navigation solution 85 such as a real-time kinematic GPS system on board the vehicle.

The outputs of the waypoint controller 62 are setpoints for vehicle velocity and yaw rate. These setpoints are provided to the rate controller 64, which generates setpoints for the left and right track speeds, based on the desired velocity and yaw rate. As illustrated in FIG. 16, the rate controller 64 is a feed-forward controller that uses a model to calculate the track speed setpoints. In a more complex arrangement, the rate controller 64 may be a feed-back controller that uses measurements of velocity and yaw rate from on-board instrumentation such as an inertial measurement unit. In this alternative arrangement a further summation block is provided between the waypoint controller 62 and the rate controller 64. The further summation block calculates the difference between the measured velocity and yaw rate to provide an error signal for each variable. PI or PID controllers in the rate controller 64 may then be used to calculate control outputs for provision to the actuator controller.

The rate controller 64 provides setpoints for track speeds. The summation block between the rate controller 64 and the actuator controller 66 provides the difference between the track speed setpoints and measured indications of the actual track speed that come from track encoders 86. The error signal from the summation block is provided as an input to the actuator controller 66.

The output of the track encoders 86 may be filtered, for example by a low-pass filter.

Actuator Controller

The actuator controller 66 is the logic nearest the track-driving actuators 84. It takes track speed setpoints from the rate controller 64 and generates actuating signals for the left and right tracks as its outputs. It uses two track encoders 86 to perform closed loop control.

In practice a PI or PID controller can be used to control these two track speeds, with a pressure relief for safety. Control feedback is provided by two track encoders 86. The actuator controller may utilize output calibration as its input shaping technique.

Rate Controller

The rate controller 64 sits in between the waypoint controller 62 and the actuator controller 66. It receives the speed and yaw rate setpoints as inputs from the waypoint controller and, in the case when measurements of speed and yaw rate are available, the rate controller 64 may generate track speed controls using two PI or PID controllers.

If the vehicle does not have an IMU, the track speed setpoints may be calculated by the rate controller as follows. Assuming the control point of the drill is at its center of rotation, using a clockwise positive coordinate frame, we have the following equations for yaw rate and velocity:

$$\theta = \frac{SR - SL}{Base} \quad (1)$$

$$v = \frac{SR + SL}{2} \quad (2)$$

where SR is the speed of the right track, SL is the speed of the left track, and Base is the distance between the two tracks. Solving for SR and SL gives:

$$SR = \frac{2v + Base\theta}{2} \quad (3)$$

$$SL = \frac{2v - Base\theta}{2} \quad (4)$$

Feedbacks of the two control variables may be taken from an inertial measurement unit (IMU) fitted to the vehicle (not shown in the drawings). In the application illustrated in FIG. 16, it was decided that the cost of adding an IMU outweighed the benefits for control. The rate controller closes the control loop to regulate the velocity and yaw rate.

Waypoint Controller

The waypoint controller 62 is the top level tracking controller in the drill tramming system. The waypoint controller implements a waypoint following algorithm with a minimum amount of external perception ability. Its functionality is implemented based on position information from a GPS navigation unit 85 and the waypoint list received from the path planner. It is only responsible for following the planned trajectory. The waypoint controller 62 takes the received waypoint as is, and tries its best to execute the planned path.

The waypoint controller 62 receives waypoint lists, which are ordered coordinate point lists, as its inputs from the operation planner 50 and generates speed and yaw rate outputs. The implemented trajectory tracking control is separated into two parts, 1) speed regulation and 2) steering regulation. Unlike a wheeled vehicle that has a natural decoupling of the speed and the turn rate controls, the speed and turn rate are tightly coupled for a tracked drill rig vehicle. Extra care is taken to ensure valid controls, i.e., controls that are within the physical capability of the drill, are issued to lower-level controllers.

After a waypoint list is received by the waypoint controller 62, it estimates the desired instance speed at each waypoint in the list. The estimation is carried out based on the heading change rate at the waypoint, which is representative of the path curvature at that point. For the sake of simplicity, the relative turn rate at each waypoint is approximated by the trajectory cornerity at the waypoint. The trajectory cornerity can be computed using the method described in Haralick, R.M., Shapiro, L.G.: "Computer and Robot Vision" (Volume 1) Prentice Hall (2002) for example.

Cornerity is a measure that describes the suddenness of changes in direction of a path. Or, in other words, it is the change in direction of the tangent at the point, as well as a measure of how differentiable the path is. In this implementation, it is computed as the following:

Cornerity at $P_{curr}$=dot($V_1$, $V_2$)(dot-product of $V_1$, $V_2$)

where $$V_1 = \frac{P_{pre} - P_{curr}}{|P_{pre} - P_{curr}|}$$

$$V_2 = \frac{P_{post} - P_{curr}}{|P_{post} - P_{curr}|}$$

$P_{curr}$ is the current waypoint,
$P_{pre}$ is a point on the path somewhere before $P_{curr}$, and
$P_{post}$ is another point on the path somewhere after $P_{curr}$.
All, $P_{curr}$, $P_{pre}$ and $P_{post}$ are coordinates.

Both $V_1$ and $V_2$ are unit vectors. The dot product of $V_1$ and $V_2$ equals to cosine(theta), where theta is the angle defined by $P_{pre}$, $P_{curr}$, and $P_{post}$. It can be seen that when cos(theta) equals to one, theta is zero, $P_{pre}$, $P_{curr}$, and $P_{post}$ are on the same line. On the other extreme, when cos(theta) is zero, theta is pi/2, $P_{pre}$, $P_{curr}$, and $P_{post}$ form a right angle.

This algorithm is performed for all waypoints on a path to find the cornerity at each waypoint, and the maximum cornerity of all points is defined as the cornerity of the path. The estimated waypoint speed setpoint hence is:

$$v = k_{constant} \times \text{Cornerity} \quad (5)$$

Waypoint speed is the basis for the controlled vehicle speed. Since the waypoint speed is estimated beforehand with little consideration of the runtime vehicle turning, it is difficult to ensure its validity at the runtime. Therefore, the controlled vehicle speed is further verified against the controlled vehicle turning rate. If the controlled vehicle speed exceeds a maximum allowed speed for the specific turning rate, the controlled speed is then reduced.

The maximum allowed speed for a given turning rate is computed as:

$$v = -\left(\frac{V_{max}}{\theta_{max}}\right)\theta + V_{max} \quad (6)$$

where $V_{max}$ is the maximum allowed velocity and the $\theta_{max}$ is the maximum allowed yaw rate.

Steering regulation is realized in a proportional and integral fashion. The control strategy is designed around error corrections. We define three errors, vehicle heading error, e($\omega$), waypoint heading error, e($\delta$), and cross-track error, e(x), in the path tracking process. The waypoint controller constantly monitors these three errors and issues steering commands to correct them. The resulting control law for turning rate has six tuned parameters ($K_\omega$, $\alpha_\omega$, $K_\delta$, $\alpha_\delta$, $K_x$, $\alpha_x$) and can be written as:

$$\theta_s = \left(K_\omega + \frac{\alpha_\omega}{s}\right)(e(\omega)) + \left(K_\delta + \frac{\alpha_\delta}{s}\right)(e(\delta)) + \left(K_x + \frac{\alpha_x}{s}\right)(e(x)) \quad (7)$$

Figure 17A:
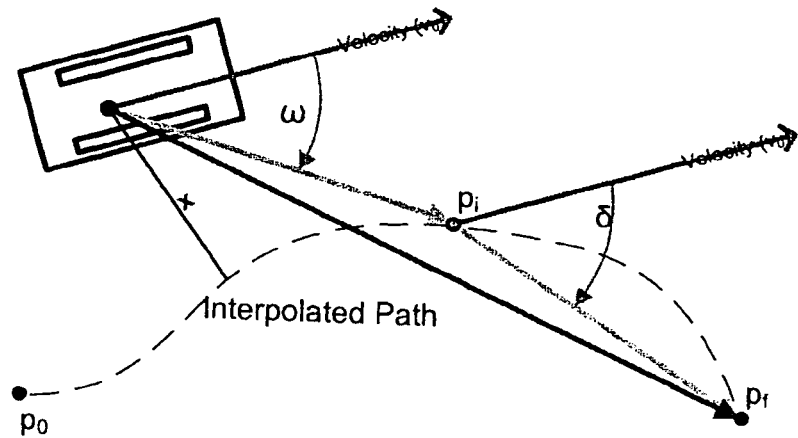
FIG. 17A is a diagrammatic illustration of vehicle waypoint path following.

FIG. 17A provides a diagrammatic illustration of the vehicle waypoint path following error types. The controller compensates position and orientation between an initial point ($p_0$, intermediate point ($p_i$) and final point ($p_f$) by factoring cross-track error (x) to the current smooth interpolated path (dashed line), and orientation differences between the current and forward waypoints (angles $\theta$ and $\delta$).

Figure 17B:
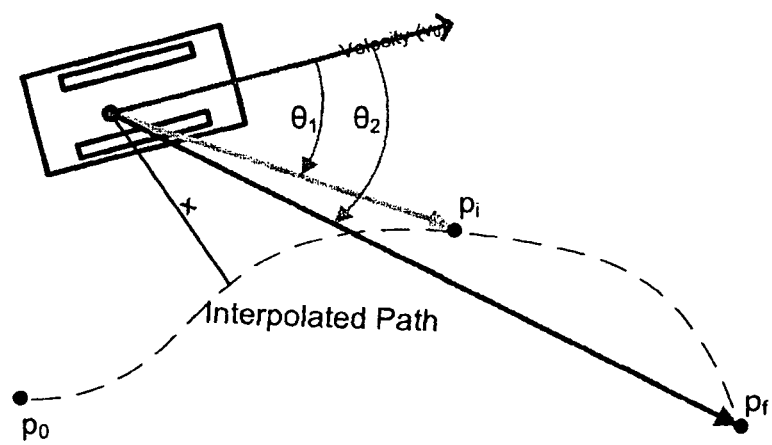
FIG. 17B illustrates angles used to calculate a desired heading direction in controlling the waypoint path following.

As shown in FIG. 17B, the vehicle heading error $\omega$ is defined as the angular difference between the vehicle heading and a vector that is calculated dependent on the vehicle position, the current tracking waypoint and the following waypoint. In our setting, the current tracking waypoint is always ahead of the vehicle in the direction that the vehicle travels. Correcting the vehicle heading error pulls vehicle towards the direction of the path. The desired heading direction is jointly defined by the vehicle position, the current tracking waypoint and the following waypoint. In this setting, the desired heading direction is a weighted average between the vector defined by the vehicle position and the current tracking waypoint and the vector defined by the vehicle position and the following tracking waypoint. The desired heading direction may be defined as:

$$\theta = \frac{d}{D}\theta_2 + \frac{D-d}{D}\theta_1 \quad (8)$$

where D is the distance between the current tracking point and the previous waypoint,
   d is the distance between the current vehicle position and the previous waypoint,
   $\theta_1$, is the angle between the vehicle heading and the vector defined by the current tracking waypoint and the vehicle position,
   $\theta_2$ is the angle between the vehicle heading and the vector defined by the following waypoint and the vehicle position.

The deviation from this desired heading angle $\theta$ may be used as the $e(\omega)$ term in equation (7).

This technique provides one step look-ahead for the waypoint tracking. It also removes abrupt changes in the error measurement during the transition of the tracking waypoint.

The waypoint heading error is defined as the angular difference between the vehicle heading and the desired heading at the tracking waypoint. The desired heading at a waypoint is then defined as the vector that connects the waypoint and its successive waypoint.

The cross-track error is defined as the distance between the vehicle position and the planned path. Even though paths are represented as waypoint lists, it is problematic to define the cross-track error as the distance between the vehicle position and the tracking waypoint. As this inevitably introduces sudden changes in the error reading while the vehicle transits from one tracking waypoint to another and brings disturbances to the control. To solve this problem the waypoint controller further interpolates the planned path with high order splines and then take fine discretization in the interpolation. We then measure the cross-track error as the distance between the vehicle position and the nearest point from the fine-grained path interpolation. This gives accurate reading in the cross-track error and avoids all abrupt changes in error reading due to transition of the tracking waypoint.

The distance between two adjacent waypoints is an important quantity that should be carefully selected in practice. Even though the control law (equation (7)) holds for any spacing between waypoints, this is not an arbitrary quantity. In the practical implementation, many of the gains in the PID controllers depend on this waypoint spacing. It also determines how much look-ahead the controller does, which impacts on path tracking performance significantly. Change in this spacing from the current 0.5 meter to plus or minus 20% may be tolerable but beyond that the machine may fail to track its planned path without adjustment of the PI or PID controllers.

In any event, the PID gains ($K_\omega$, $K_\delta$, $K_x$ in the control law, equation (7)) are much more flexible than might be first assumed. Even though equation (7) is considered the master equation that governs the path following operation, it has been found that, due to the slowness of the operation, these three gain settings are much more robust to changes than similar settings applied to a light autonomous vehicle. This indicates the implemented autonomous control algorithm may be robust to possible physical variations across multiple drills in the same model, for example. It may ease the task of deploying the automation software package into different drills with a minimum amount of re-tuning required.

Finally, it should be noted that for practical implementation a different logic may be used at the end of trajectory tracing, when the drill is fairly close to its final destination, (e.g. within 0.5 meters). The way we define the angular error in the path tracking process, (i.e. the definition of theta in equation (8)) provides one step look ahead for the drill and a weighted average is used to compute the amount of look ahead (equation (8)). However, the problem with such approach occurs at the end of the path where there is only one waypoint left and there is no further waypoint to provide look-ahead guidance. The tracking is entirely reliant on the information provided by the last waypoint. In such case, when the drill nears its final destination, the angular error may get significantly large, as the position of the drill approaches the final point. A large angular error throws a large control command, in yaw rate, which makes the drill turn at its final destination, and hence produces more positioning error. Therefore, in one arrangement a two mode control is applied during a path tracking process. In the normal mode, equation (7) is the governing equation for the system. As the drill approaches its final destination, a separate mode is used. In this mode, in equation (7), both the cross-track term (e(x)) and the vehicle heading error term (e($\omega$)) are set to zero, regardless their values through computations. The reason for setting e(x) to zero is similar, as the estimation of cross track error when the drill is close to its last planned waypoint is also problematic.

Experimental Results

Figure 18:
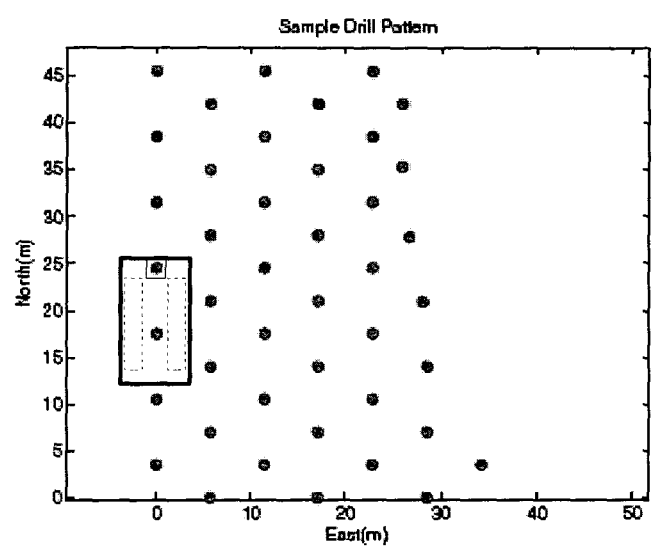
FIG. 18 illustrates a sample drill hole pattern.

The control system has been implemented for the purposes of experimental trials of the tramming method performance on a blast-hole drill rig at the West Angeles iron-ore mine. Over 100 hours of autonomous production operation were completed over a variety of bench types. FIG. 18 illustrates an example of a blast hole drill pattern. The performance of the control methods is shown in path following and drill positioning experiments as measured using the on-board D-GPS position when the machine came to a rest as compared to desired points as planned and surveyed in advance by mine staff.

The hierarchical software architecture and control mechanism for autonomous vehicle tramming in open-pit mines as herein described has a tramming controller that utilizes a modified waypoint-following path-tracking technique specialized for the high-inertia of the vehicle. The method was implemented as a set of modules and deployed on a 98-ton Reedrill SKSS-15 blast-hole rig in production environments. The blast-hole drill rig used for trials is 13 meters by 5.8 meters and has a mast 17 meters tall. It is suspended on two large tracks and moves by skid-steering. The system is driven using hydraulics (500 psi) and powered by a 1000 HP diesel motor. It is capable of generating 86 kips of pull down force on the drill bit. Navigation was performed by a Topcon D-GPS suspended on the mast and two generic track encoders with an effective 0.15 meter resolution.

Path following

Figure 19:
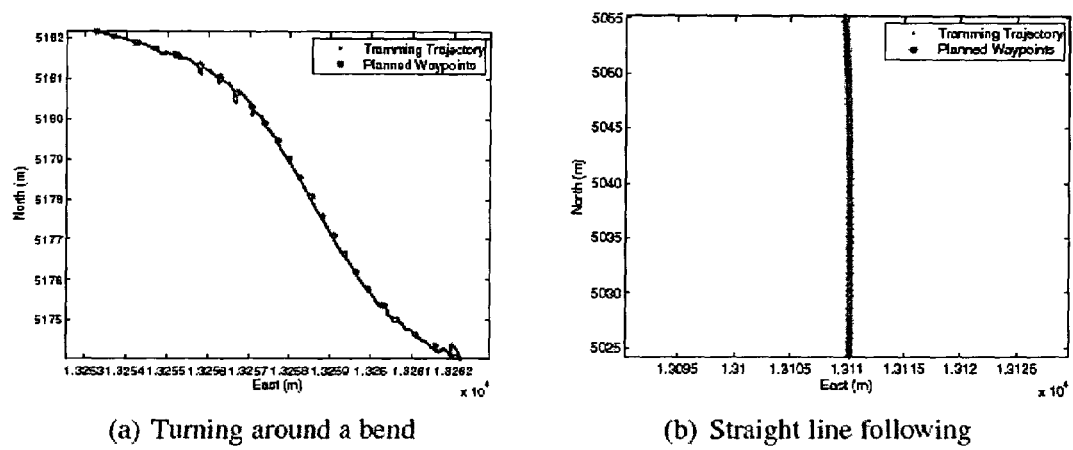
FIGS. 19 (a) and (b) are graphs illustrating autonomous vehicle path following trial performances.

A given sequence will specify the order and orientation drill pattern for the bench. From this a sequence of waypoints is generated. The machine is then driven along a path defined by these waypoints. Motion is constrained by two competing objectives. First, it is desirable to drive as quickly as possible to meet production requirements. However, it is important that the drill does not deviate significantly from the prescribed path given the presence of obstacles and crests. FIG. 19 illustrates the results of two path following examples. In FIG.

19(a) a fair amount of turning is involved as the drill moves around a bend in a row-shifting maneuver that is used frequently in production. Note the drill mast vibration evident by the circular wiggles present on the graph. In FIG. 19(b) a 30 m long straight line trajectory is shown with minimal deviation. The two graphs demonstrate a fairly accurate path following performance. In particular, for tramming both a straight and curved path, the control method follows the desired trajectory with a 12 cm average deviation at speeds that are comparable to manual operation.

An additional controller may be provided for the motion of the drill based on environmental sensing performed at the drill. For example, in some embodiments, a laser and/or video sensor may be provided on-board the drill, connected to a controller that detects the presence of an obstacle in the path of the drill. Upon such detection, the controller may identify a path around the obstacle and change the path of the drill accordingly. Alternatively, another action may be performed, such as ceasing movement of the drill until an operator provides additional input.

Drill Mast Positioning

An additional goal of automation is the efficient execution of drill pattern plans. The feed-forward controller is able to partially compensate for the vehicle suspension compliance and has an average 14 cm error. This is particularly notable since it is less error than manual operation (40 cm), yet is performed in similar time.

Experimental results include complete autonomous operation in production drill hole patterns. The designed controller has been demonstrated capable of satisfying dominating requirements of mining production in real-time: maintaining good overall path tracking performance and operation times compared to manual operation and realizing accurate drill hole positioning. The average cross-track error in the production hole drilling experiments is 0.12 meters and the average positioning error is 0.14 meters.

Figure 20:
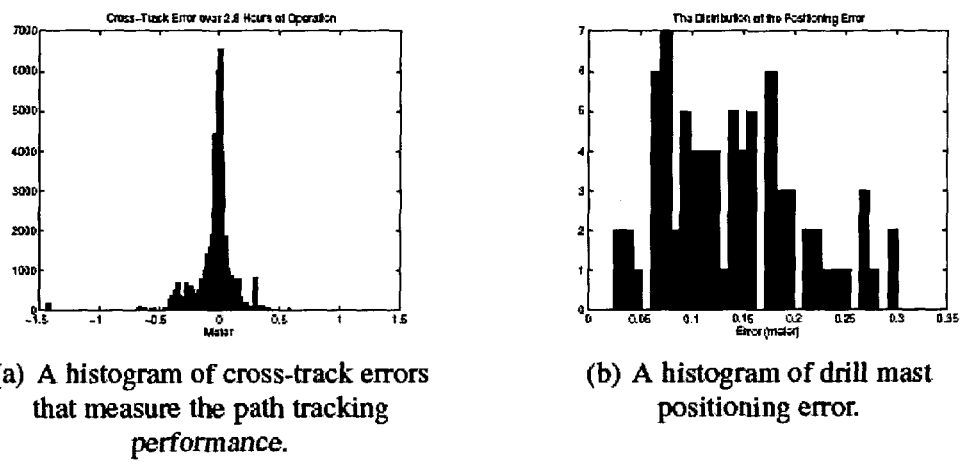
FIGS. 20 (a) and (b) show histograms of vehicle path tracking performances for drill mast positioning.

FIG. 20 illustrates path tracking performances for drill mast positioning from the trials. FIG. 20(a) is a histogram of cross-track errors that measure the path tracking performance over 2.8 hours of operation. FIG. 20(b) is a histogram of drill mast absolute positioning error, in which the largest positioning error is 0.3m.

Figure 21:
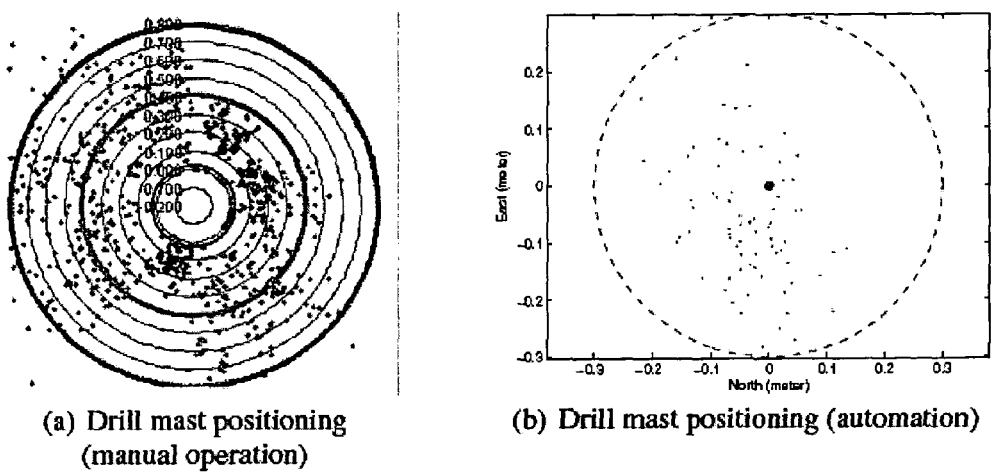
FIGS. 21 (a) and (b) illustrate drill mast positioning performance results for manual and automated operations

FIG. 21 illustrates a comparison of drill mast positioning performances for manual and automated operations. FIG. 21(a) is a sample distribution chart of drill mast positioning using manual drill vehicle operation, whilst FIG. 21(b) is a sample distribution chart of automated drill mast positioning.

The tramming controller described with reference to FIG. 16 relates to the control of a tracked vehicle. A similar architecture may be used for the autonomous navigation of other types of vehicles, for example wheeled vehicles. In this case, the waypoint controller 62 still receives data describing the desired trajectory and calculates velocity and yaw setpoints for the vehicle. The rate controller 64 may use a model of the steering system of the vehicle to calculate desired actions of the vehicle's actuators. This model will be different from the track model of equations (1)-(4). The low level actuator control then ensures that the vehicle actuators operate in accordance with the actuator setpoints.

The application described herein relates to navigation to an ordered sequence of drill-hole locations. It will be appreciated that the methods may also apply to autonomous navigation in general, where a series of locations is specified. The path planner determines a feasible trajectory linking the series of locations. The tramming controller monitors and controls the vehicle movement to follow the calculated trajectory.

Throughout this specification, unless the context requires otherwise, the word "comprise", or variations such as "comprises" and "comprising", will be understood to imply the inclusion of a stated integer or group of integers but not the exclusion of any other integer or group of integers.

The foregoing description of control systems and methods for navigating autonomous vehicles, and in particular tramming surface drill rig vehicles in an open-cut mining scenario, has been presented only to provide an example of application and implementation of the broader invention and is not intended to limit the scope of the invention which includes each and every novel feature and combination of novel features herein disclosed.

What is claimed is:

1. An autonomous navigation system for a tracked or skid-steer vehicle comprising:
a path planner that computes a series of waypoint locations specifying a path to follow;
a vehicle location sensor;
a tramming controller including a waypoint controller that computes vehicle speed and yaw rate setpoints based on vehicle location information from the vehicle location sensor and the locations of a plurality of neighbouring waypoints, and a rate controller that generates left and right track speed setpoints from the speed and yaw rate setpoints; and
a vehicle control interface that actuates vehicle controls in accordance with the left and right track speed setpoints.

2. An autonomous navigation system according to claim 1, wherein the waypoint controller uses a calculation of trajectory curvature determined at the waypoint nearest to the vehicle for computing the vehicle speed setpoint.

3. An autonomous navigation system according to claim 2 wherein, in computing the vehicle speed setpoint the waypoint controller also uses a measurement of the vehicle speed and yaw rate, and the maximum allowed vehicle speed and yaw rate.

4. An autonomous navigation system according to claim 1 wherein, in computing the vehicle yaw rate setpoint, the waypoint controller calculates a vehicle heading error defined by the angular difference between the vehicle heading and a vector dependent on the vehicle position, the current tracking waypoint and the following waypoint.

5. An autonomous navigation system according to claim 4 wherein, in computing the vehicle yaw rate setpoint, the waypoint controller calculates a waypoint heading error defined by the angular difference between the vehicle heading and the desired heading at the current tracking waypoint, wherein the desired heading at a waypoint is defined as the vector that connects the waypoint and its successive waypoint.

6. An autonomous navigation system according to claim 5 wherein, in computing the vehicle yaw rate setpoint, the waypoint controller calculates a cross-track error defined by the distance between the vehicle position and the planned path.

7. An autonomous navigation system according to claim 6, wherein the cross-track error corresponds to the distance between the vehicle position and the nearest point from a fine discretization of an interpolated path through the waypoints.

8. An autonomous navigation system according to claim 6, wherein the waypoint controller computes the vehicle yaw rate setpoint on the basis of a weighted combination of the vehicle heading error, the waypoint heading error, and the cross-track error.

9. An autonomous navigation system according claim 1 implemented on a surface drilling rig for drilling blast hole patterns in mining operations.

10. An autonomous navigation system according to claim 1, including a vehicle location sequencer that determines an ordered sequence of desired vehicle locations, and wherein the waypoints computed by the path planner specify a path between the desired vehicle locations.

11. An autonomous navigation system according to claim 10 wherein the path planner determines a path between desired vehicle locations using a cubic Bezier spline satisfying one or more predetermined path constraints including at least one minimum turning radius, obstacles and/or boundaries.

12. An autonomous navigation system according to claim 11 wherein the path planner includes a state lattice search system operating with a set of primitive expansion paths such that, if a valid path from one location to the next cannot be determined, the path planner expands its search space using the set of primitive expansion paths to a plurality of nodes defining nearby reachable vehicle configurations.

13. An autonomous navigation system according to claim 12 wherein the set of primitive expansion paths are generated using cubic Bezier splines.

14. An autonomous navigation system according to claim 13 wherein the path planner also implements a multidimensional occupancy grid representation for path verification.

15. A method for autonomous navigation of a tracked or skid-steer vehicle, comprising:
   determining by a processor a path plan including a series of computed waypoint locations specifying a path to follow;
   measuring the vehicle location and velocity;
   computing by the processor vehicle speed and yaw rate setpoints based on the measured vehicle location and velocity and the locations of a plurality of neighbouring waypoints;
   generating left and right track speed setpoints from the speed and yaw rate setpoints; and
   controlling the vehicle left and right tracks in accordance with the left and right track speed setpoints.

16. A method for autonomous vehicle navigation according to claim 15 wherein computation of the vehicle speed setpoint is based on a calculation of trajectory curvature determined at the waypoint nearest to the vehicle.

17. A method for autonomous vehicle navigation according to claim 16 wherein computation of the vehicle speed setpoint also uses a measurement of the vehicle speed and yaw rate, and the maximum allowed vehicle speed and yaw rate.

18. A method for autonomous vehicle navigation according to claim 15 wherein computation of the vehicle yaw rate setpoint is based on a vehicle heading error defined by the angular difference between the vehicle heading and a weighted average vector dependent on the vehicle position, the current tracking waypoint and the following waypoint.

19. A method for autonomous vehicle navigation according to claim 18 wherein computation of the vehicle yaw rate setpoint is also based on a waypoint heading error defined by the angular difference between the vehicle heading and the desired heading at the current tracking waypoint, wherein the desired heading at a waypoint is defined as the vector that connects the waypoint and its successive waypoint.

20. A method for autonomous vehicle navigation according to claim 19 wherein computation of the vehicle yaw rate setpoint is also based on a cross-track error defined by the distance between the vehicle position and the planned path.

21. A method for autonomous vehicle navigation according to claim 20 wherein the cross-track error is defined by the distance between the vehicle position and the nearest point from a fine discretization of an interpolated path through the waypoints.

22. A method for autonomous vehicle navigation according to claim 20 wherein the vehicle yaw rate setpoint is computed on the basis of a weighted combination of the vehicle heading error, the waypoint heading error, and the cross-track error.

23. A method for autonomous vehicle navigation according to claim 15 implemented on a surface drilling rig for drilling blast hole patterns in mining operations.

24. A method for autonomous vehicle navigation according to claim 15 including a vehicle location sequencing step that determines an ordered sequence of desired vehicle locations, wherein the waypoints computed in the path plan specify a path between desired vehicle locations.

25. A method for autonomous vehicle navigation according to claim 24 including determining a path between desired vehicle locations using a cubic Bezier spline satisfying one or more path constraints including at least one of minimum turning radius, obstacles and/or boundaries.

26. A method for autonomous vehicle navigation according to claim 25 including a state lattice search using a set of primitive expansion paths such that, if a valid path from one location to the next cannot be determined, the search space is expanded using the set of primitive expansion paths to a plurality of nodes defining nearby reachable vehicle configurations.

27. A method for autonomous vehicle navigation according to claim 26 wherein the set of primitive expansion paths are generated using cubic Bezier splines.

28. A method for autonomous vehicle navigation according to claim 27 wherein determining a path plan also includes use of a multidimensional occupancy grid representation for path verification.

29. A path planning system for autonomous vehicle having actuators for moving and steering the vehicle, the system comprising:
   a path planner that receives a series of desired locations and generates path data defining a feasible path for the vehicle to traverse the series of locations;
   sensors that monitor a location and heading of the vehicle;
   a controller that receives the path data and the monitored location and heading of vehicle and determines setpoints for the actuators such that the vehicle follows the path.

30. A path planning system according to claim 29 wherein the path data comprises a series of waypoints and wherein the controller determines a desired vehicle heading that is a weighted average of:
   a first angle between the vehicle heading and a first vector defined by the vehicle location and a current waypoint; and
   a second angle between the vehicle heading and a second vector defined by the vehicle location and a subsequent waypoint in the series of waypoints.

31. A path planning system according to claim 30 wherein the weighted average depends on a distance between a current vehicle location and an earlier waypoint in the series of waypoints.

32. A path planning system according to claim 31 wherein a weighting of the second angle increases as the distance increases.

33. A method for planning a path for an autonomous vehicle having defined constraints, the method comprising:

receiving by a processor a starting location and an end location;

generating by the processor a path that connects the starting and the end locations;

if the path does not satisfy the defined constraints, applying a state lattice search in which a search space is expanded using a set of primitive expansion paths to a plurality of nodes defining nearby reachable vehicle configurations.

\* \* \* \* \*